US012597546B2

(12) United States Patent (10) Patent No.: US 12,597,546 B2
Kobayashi et al. (45) Date of Patent: Apr. 7, 2026

(54) SOLENOID, SOLENOID VALVE, AND SHOCK ABSORBER

(71) Applicant: KYB Corporation, Tokyo (JP)

(72) Inventors: Yoshifumi Kobayashi, Tokyo (JP); Tomoyasu Abe, Tokyo (JP); Toshihiro Mori, Tokyo (JP); Naoaki Danshita, Kyoto (JP); Masatoshi Iyatani, Kyoto (JP); Kohei Doi, Kyoto (JP)

(73) Assignee: KYB Corporation, Tokyo (JP)

( * ) Notice: Subject to any disclaimer, the term of this patent is extended or adjusted under 35 U.S.C. 154(b) by 513 days.

(21) Appl. No.: 18/018,164

(22) PCT Filed: Aug. 17, 2021

(86) PCT No.: PCT/JP2021/030033
§ 371 (c)(1),
(2) Date: Jan. 26, 2023

(87) PCT Pub. No.: WO2022/070641
PCT Pub. Date: Apr. 7, 2022

(65) Prior Publication Data
US 2023/0282405 A1 Sep. 7, 2023

(30) Foreign Application Priority Data
Sep. 29, 2020 (JP) ................................ 2020-163067

(51) Int. Cl.
*F16F 9/46* (2006.01)
*F16K 31/06* (2006.01)
(Continued)

(52) U.S. Cl.
CPC ............ *H01F 7/1607* (2013.01); *F16F 9/465* (2013.01); *F16K 31/0648* (2013.01); *F16K 31/0693* (2013.01); *H01F 2007/086* (2013.01)

(58) Field of Classification Search
CPC .. H01F 7/1607; H01F 2007/086; F16F 9/465; F16K 31/0648; F16K 31/0693
See application file for complete search history.

(56) References Cited

U.S. PATENT DOCUMENTS 4,251,052 A * 2/1981 Hertfelder ........... F16K 31/0655
251/129.02
2003/0038261 A1 2/2003 Katsumata et al.
(Continued)

FOREIGN PATENT DOCUMENTS

JP H06-042668 A 2/1994
JP H10-318416 A 12/1998
(Continued)

OTHER PUBLICATIONS

Oct. 29, 2024, Japanese Office Action issued for related JP Application No. 2020-163067.
(Continued)

*Primary Examiner* — David R Morris
(74) *Attorney, Agent, or Firm* — Paratus Law Group, PLLC

(57) ABSTRACT

A solenoid includes: a coil; a first fixed iron core disposed on an axial first-end side of the coil; a second fixed iron core disposed on an axial second-end side of the coil with a gap from the first fixed iron core; a tubular first movable iron core disposed between the first fixed iron core and the second fixed iron core: a second movable iron core having a tubular shape with a bottom, slidably inserted into the first movable iron core, disposed between the first fixed iron core and the second fixed iron core with a bottom portion facing the second fixed iron core; and a spring interposed between the first movable iron core and the first fixed iron core, and pressing the first movable iron core to the second fixed iron core side.

10 Claims, 8 Drawing Sheets

(51) Int. Cl.
H01F 7/16      (2006.01)
H01F 7/08      (2006.01)

(56)         References Cited

U.S. PATENT DOCUMENTS

| | | |
|---|---|---|
| 2010/0213758 A1 | 8/2010 | Nanahara et al. |
| 2016/0025178 A1 | 1/2016 | Kamakura et al. |
| 2016/0169404 A1 | 6/2016 | Choi et al. |
| 2021/0012939 A1 | 1/2021 | Kamakura et al. |

FOREIGN PATENT DOCUMENTS

| | | |
|---|---|---|
| JP | 2003-065461 A | 3/2003 |
| JP | 2009-275735 A | 11/2009 |
| JP | 2012-127462 A | 7/2012 |
| JP | 2014-173714 A | 9/2014 |
| JP | 2019-040894 A | 3/2019 |
| JP | 2019-160994 A | 9/2019 |
| JP | 2021-044320 A | 3/2021 |

OTHER PUBLICATIONS

Nov. 9, 2021, International Search Report issued for related PCT Application No. PCT/JP2021/030033.
Jun. 25, 2024, Japanese Office Action issued for related JP Application No. 2020-163067.

* cited by examiner

SOLENOID, SOLENOID VALVE, AND SHOCK ABSORBER

CROSS REFERENCE TO PRIOR APPLICATION

This application is a National Stage Patent Application of PCT International Patent Application No. PCT/JP2021/030033 (filed on Aug. 17, 2021) under 35 U.S.C. § 371, which claims priority to Japanese Patent Application No. 2020-163067 (filed on Sep. 29, 2020), which are all hereby incorporated by reference in their entirety.

TECHNICAL FIELD

The present invention relates to a solenoid, a solenoid valve provided with the solenoid, and a shock absorber provided with the solenoid valve including the solenoid.

BACKGROUND ART

A solenoid generally includes one movable iron core for a coil, and drives the movable iron core by attracting the movable iron core toward a fixed iron core when passing a current through the coil. When the solenoid is used for a solenoid valve, the solenoid can adjust valve opening pressure of the solenoid valve by changing driving force applied to a valve body of the solenoid valve when passing a current.

In order to adjust pressure of a back pressure chamber that applies back pressure to the back of a damping valve provided in a piston part of a shock absorber, the solenoid valve is provided partway in a pilot passage that reduces and guides pressure on the upstream side of the damping valve to the back pressure chamber. In the shock absorber configured in this way, when the driving force of the solenoid is changed in magnitude, the valve opening pressure of the solenoid valve is also changed in magnitude to allow the pressure in the back pressure chamber to be controlled. When the pressure in the back pressure chamber is changed, the valve opening pressure of the damping valve also changes in magnitude. Therefore, by controlling the current amount applied to the solenoid, damping force generated when the shock absorber expands and contracts can be controlled.

If a general solenoid is used for such a solenoid valve of a shock absorber, in normal times when a current can pass through the solenoid, the damping force of the shock absorber can be adjusted by controlling the current amount applied to the solenoid as described above, but at the time of failure when a current cannot pass through the solenoid, it is impossible to control the valve opening pressure of the solenoid valve by using the solenoid. Therefore, the shock absorber includes a fail valve in parallel with the solenoid valve for setting the damping force of the shock absorber at the time of failure, but if the fail valve opens in normal times, the back pressure cannot be controlled by using the solenoid valve. Therefore, it is absolutely necessary to make the valve opening pressure of the fail valve higher than a control range of the valve opening pressure of the solenoid valve in normal times. The damping force of the shock absorber at the time of failure may become excessive and impair ride quality of a vehicle.

To address such a problem, the applicant has developed an improved solenoid. The improved solenoid includes, for example, as disclosed in JP2019-160994 A, a coil, a first fixed iron core disposed on an axial first-end side of the coil, a second fixed iron core disposed on an axial second-end side of the coil with a gap from the first fixed iron core, a first movable iron core disposed between the first fixed iron core and the second fixed iron core and attracted to the first fixed iron core by passing a current through the coil, a second movable iron core disposed between the first fixed iron core and the second fixed iron core and attracted to the second fixed iron core by passing a current through the coil, and a spring interposed between the first movable iron core and the first fixed iron core and pressing the first movable iron core to the second fixed iron core side.

The improved solenoid configured in this way attracts the first movable iron core to the first fixed iron core side to prevent pressing force of the spring from acting on the second movable iron core when a current passes and applies force that attracts the second movable iron core to the second fixed iron core side to the valve body of the solenoid valve. The conventional solenoid is configured such that, when no current passes, the first movable iron core is pushed against the second movable iron core by the pressing force of the spring, and the pressing force of the spring acts on the valve body of the solenoid valve via the second movable iron core. Therefore, the improved solenoid applies driving force in the same direction to the valve body of the solenoid valve not only when a current passes but also when no current passes, and can set the driving force at the time of failure by the pressing force of the spring. Therefore, with the improved solenoid, the valve opening pressure of the solenoid valve at the time of failure can be set by the pressing force of the spring of the solenoid, making it possible to optimize the damping force at the time of failure of the shock absorber and eliminating the need to provide the fail valve in parallel with the solenoid valve.

CITATION LIST

Patent Literature

Patent Literature 1: JP 2019-160994 A

SUMMARY OF INVENTION

However, the improved solenoid has higher machining costs because the non-magnetic filler ring provided on the inner circumference of the coil and the second fixed iron core are joined by brazing.

In order to keep the machining costs low, as illustrated in FIG. 8, a filler ring 202 may be press-fitted in the outer circumference of an annular protrusion 201a of a second fixed iron core 201. For that purpose, it is necessary to provide an annular recess 203b on the outer circumference of a bottom portion 203a of a second movable iron core 203 to avoid the protrusion 201a of the second fixed iron core 201, and in order to secure the magnetic path cross-sectional area between the bottom portion 203a and a tubular portion 203c, the axial length of the bottom portion 203a of the second movable iron core 203 needs to be increased accordingly.

Here, the improved solenoid includes two movable iron cores. Both the first movable iron core and the second movable iron core are tubular with a bottom. An arrangement is adopted in which the first movable iron core is slidably inserted into the second movable iron core. The first movable iron core and the second movable iron core form a magnetic path. Therefore, when a high current passes through the solenoid and the second movable iron core and the first movable iron core are most separated from each other, if the length of overlap between the two movable iron cores in the axial direction decreases, the magnetic flux will be saturated and sufficient driving force will not be obtained. Therefore, it is necessary to secure the axial length of the tubular portion 203c. For the above reason, to reduce the cost of the solenoid, the axial length of the second movable iron core 203 needs be increased, and the axial length of the solenoid also needs to be increased.

Therefore, to reduce the cost of the solenoid, the axial length of the solenoid needs to be increased, leading to larger size of the solenoid. It may be difficult to mount the shock absorber or the like on an applied device, and the solenoid may not be installed on the applied device due to the installation space.

In this way, the improved solenoid has a problem of not being able to exert sufficient driving force unless the solenoid is enlarged in order to reduce the cost.

Therefore, an object of the present invention is to provide a solenoid that can exert sufficient driving force at low cost without increasing the size, to provide a solenoid valve that can adjust the valve opening pressure at low cost without increasing the size, and to further provide a shock absorber that can adjust the damping force at low cost without increasing the size.

To solve the above-described problem, a solenoid according to the present invention includes: a coil; a first fixed iron core disposed on an axial first-end side of the coil; a second fixed iron core disposed on an axial second-end side of the coil with a gap from the first fixed iron core; a tubular first movable iron core disposed between the first fixed iron core and the second fixed iron core, and attracted to the first fixed iron core by passing a current through the coil; a second movable iron core having a tubular shape with a bottom and slidably inserted into the first movable iron core, the second movable iron core being disposed between the first fixed iron core and the second fixed iron core with the bottom facing the second fixed iron core, and attracted to the second fixed iron core by passing the current through the coil; and a spring interposed between the first movable iron core and the first fixed iron core, and pressing the first movable iron core to the second fixed iron core side.

With the solenoid configured in this way, since the first movable iron core, not the second movable iron core, is disposed in the outer circumference, flux saturation can be suppressed without increasing the axial length of the second movable iron core, and even in a situation where the first movable iron core and the second movable iron core are most separated, the sufficient length where the first movable iron core is in contact with the second movable iron core is ensured.

DESCRIPTION OF EMBODIMENTS

Figure 1:
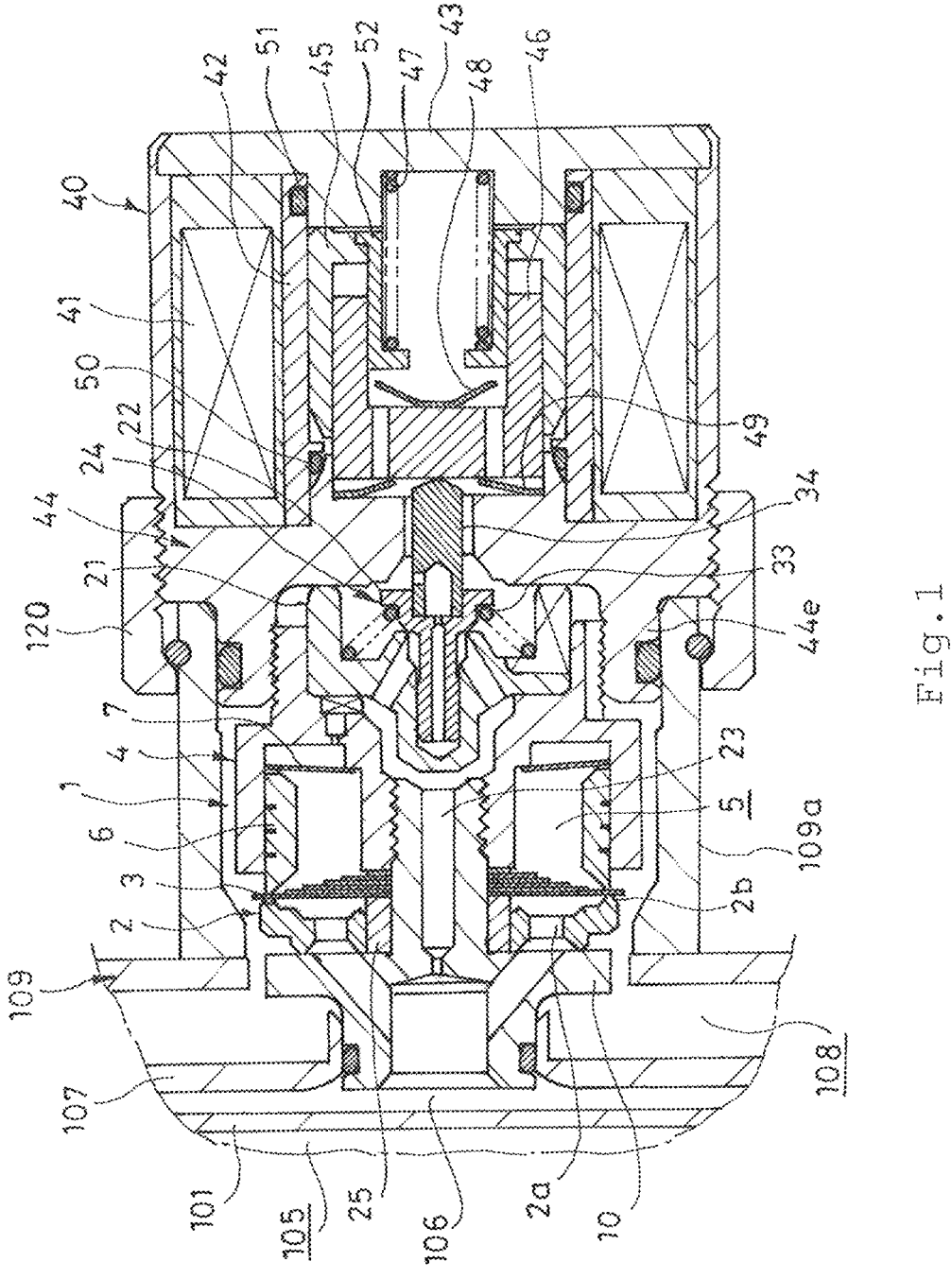
FIG. 1 is a longitudinal sectional view illustrating a damping valve according to one embodiment of the present invention.
Figure 5:
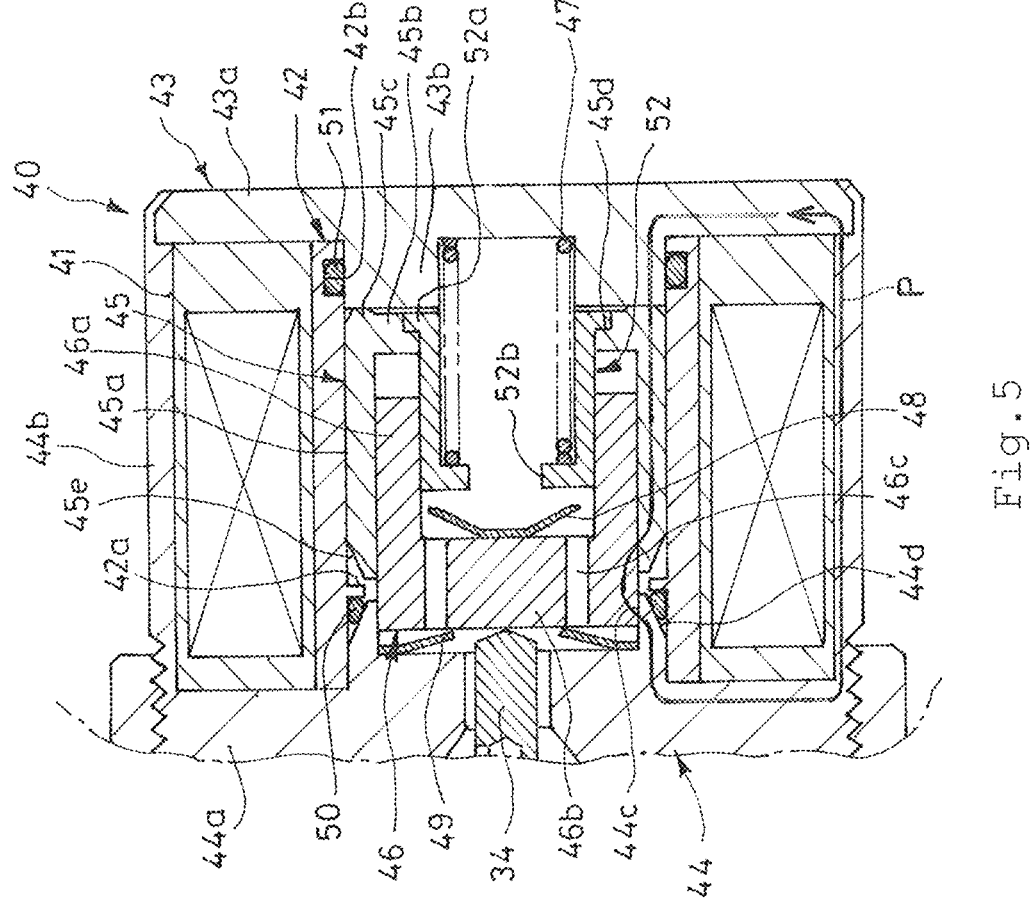
FIG. 5 is an enlarged view of a solenoid portion of the damping valve according to one embodiment of the present invention.

Hereinafter, the present invention will be described on the basis of one embodiment illustrated in the drawings. A solenoid 40 according to one embodiment includes, as illustrated in FIGS. 1 and 5, a coil 41, a first fixed iron core 43 disposed on an axial first-end side of the coil 41, a second fixed iron core 44 disposed on an axial second-end side of the coil with a gap from the first fixed iron core 43, a tubular first movable iron core 45 disposed between the first fixed iron core 43 and the second fixed iron core 44, a second movable iron core 46 having a tubular shape with a bottom and slidably inserted into the first movable iron core 45, and a spring 47 interposed between the first movable iron core 45 and the first fixed iron core 43, and pressing the first movable iron core 45 to the second fixed iron core 44 side. The solenoid 40 is applied to a solenoid valve 24 in a shock absorber 100.

The solenoid valve 24 is used to adjust back pressure acting on a leaf valve 3 of a damping valve 1 in the shock absorber 100, and adjusts the back pressure in magnitude by adjusting a current amount applied to the solenoid 40.

The solenoid 40, and the damping valve 1 and the shock absorber 100 including the solenoid valve 24 to which the solenoid 40 is applied will be described in detail below. To begin with, as illustrated in FIG. 1, the damping valve 1 includes a disk 2 with a port 2a and a valve seat 2b surrounding the port 2a, the leaf valve 3 that opens and closes the port 2a by causing the front side to sit on and leave the valve seat 2b, a tubular housing 4 provided on the back side of the leaf valve 3, an annular spool 6 that abuts on the back of the leaf valve 3 and is slidably inserted into the inner circumference of the housing 4 to form a back pressure chamber 5 that causes the back pressure to act on the leaf valve 3 inwardly together with the housing 4, an annular spring support portion 4g that is located on the back side of the leaf valve 3, faces the inside of the back pressure chamber 5, and has a smaller outer diameter than the spool 6, an annular leaf spring 7 that is interposed between one end of the spool 6 that is the opposite end of the leaf valve and the spring support portion 4g and presses the spool 6 in a direction of abutting on the leaf valve 3, a valve holding member 10, a pilot passage 23 that guides upstream pressure of the port 2a to the back pressure chamber 5, the solenoid valve 24 provided in the pilot passage 23, and the solenoid 40 giving driving force to the solenoid valve.

This damping valve 1 is applied to the shock absorber 100. The shock absorber 100 is configured to generate damping force primarily by giving resistance to liquid passing through the port 2a during expansion and contraction.

Figure 2:
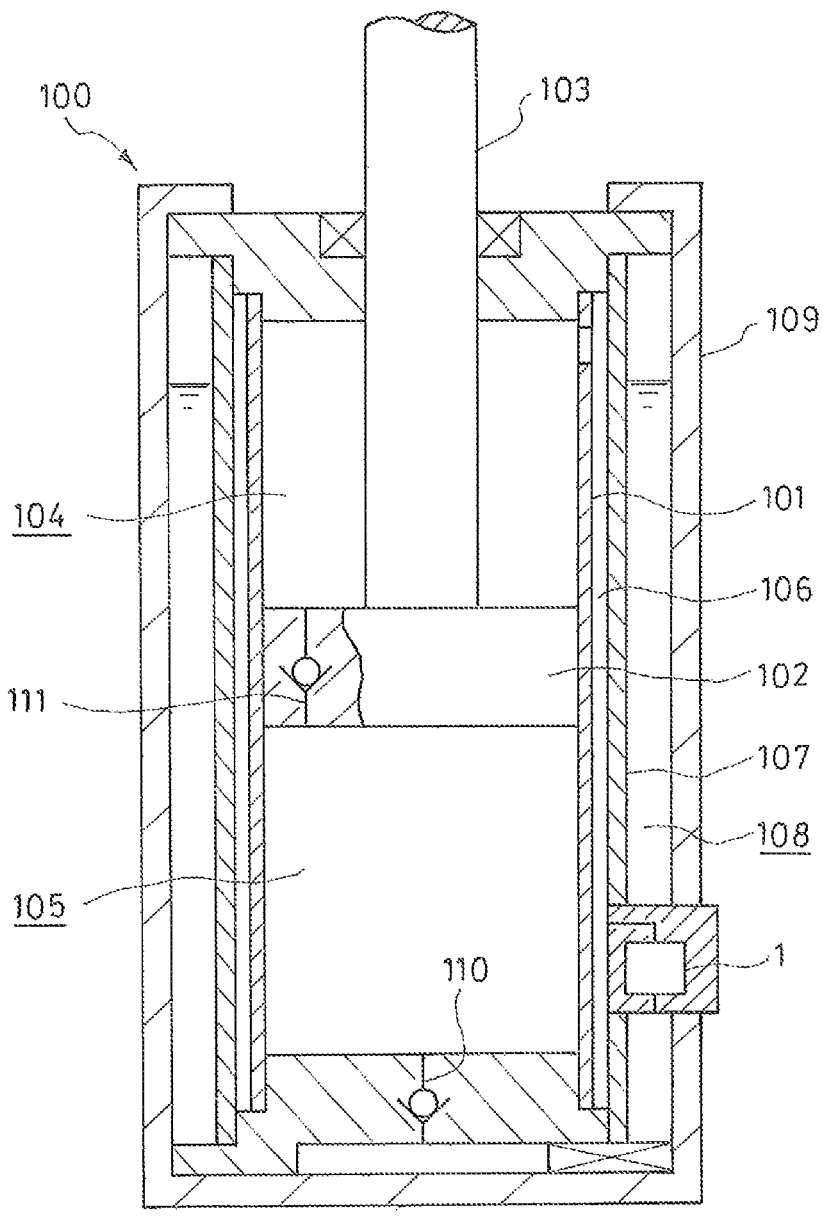
FIG. 2 is a longitudinal sectional view conceptually illustrating a shock absorber including the damping valve according to one embodiment of the present invention.

The shock absorber 100 to which the damping valve 1 is applied includes, for example, as illustrated in FIG. 2, a cylinder 101, a piston 102 inserted slidably into the cylinder 101, a rod 103 that is moved and inserted into the cylinder 101 and connected to the piston 102, an extension side chamber 104 and a compression side chamber 105 divided by the piston 102 inserted into the cylinder 101, an intermediate tube 107 covering the outer circumference of the cylinder 101 to form a discharge passage 106 between the intermediate tube 107 and the cylinder 101, and an outer tube 109 covering the outer circumference of the intermediate tube 107 to form a reservoir 108 between the outer tube 109 and the intermediate tube 107. The extension side chamber 104 and the compression side chamber 105 are filled with liquid, and not only liquid but also gas is sealed in the reservoir 108. Note that the shock absorber 100 of the present embodiment uses hydraulic oil as the liquid. However, liquid other than hydraulic oil can be used as long as the liquid can exert damping force by using the damping valve 1.

The shock absorber 100 includes a suction passage 110 that allows only the flow of hydraulic oil from the reservoir 108 to the compression side chamber 105, and a rectifying passage 111 provided in the piston 102 to allow only the flow of hydraulic oil from the compression side chamber 105 to the extension side chamber 104. The discharge passage 106 cause the extension side chamber 104 to communicate with the reservoir 108. The damping valve 1 connects the port 2a to the discharge passage 106 and is provided partway in the discharge passage 106.

Therefore, when this shock absorber 100 performs a compression operation, the piston 102 moves downward in FIG. 2, the compression side chamber 105 is compressed, and the hydraulic oil in the compression side chamber 105 moves to the extension side chamber 104 via the rectifying passage 111. During the compression operation, since the rod 103 enters the cylinder 101, the hydraulic oil becomes excessive for the rod entering volume within the cylinder 101, and the excessive hydraulic oil is pushed out from the cylinder 101 and discharged to the reservoir 108 via the discharge passage 106. The shock absorber 100 gives resistance to the flow of hydraulic oil moving through the discharge passage 106 to the reservoir 108 with the damping valve 1, raises the pressure within the cylinder 101 to exert compression side damping force.

Conversely, when the shock absorber 100 performs an expansion operation, the piston 102 moves upward in FIG. 2, the extension side chamber 104 is compressed, and the hydraulic oil in the extension side chamber 104 moves to the reservoir 108 via the discharge passage 106. During the expansion operation, the piston 102 moves upward, the volume of the compression side chamber 105 expands, and the hydraulic oil corresponding to this expansion is supplied from the reservoir 108 via the suction passage 110. Then, the shock absorber 100 gives resistance to the flow of hydraulic oil moving through the discharge passage 106 to the reservoir 108 with the damping valve 1, raises the pressure within the extension side chamber 104 to exert extension side damping force.

As can be understood from the above description, the shock absorber 100 is set to a uniflow shock absorber in which, when exhibiting expansion and contraction operations, the hydraulic oil is always discharged from the inside of the cylinder 101 to the reservoir 108 via the discharge passage 106, the hydraulic oil circulates through the compression side chamber 105, the extension side chamber 104, and the reservoir 108 in one-way order, and the damping force on both sides of extension and compression is generated by the single damping valve 1.

Subsequently, as described above, the damping valve 1 includes the disk 2 with the port 2a and the valve seat 2b surrounding the port 2a, the leaf valve 3 that opens and closes the port 2a by causing the front side to sit on and leave the valve seat 2b, the tubular housing 4 provided on the back side of the leaf valve 3, the annular spool 6 that abuts on the back of the leaf valve 3 and is slidably inserted into the inner circumference of the housing 4 to form the back pressure chamber 5 that causes the back pressure to act on the leaf valve 3 inwardly together with the housing 4, the annular spring support portion 4g that is located on the back side of the leaf valve 3, faces the inside of the back pressure chamber 5, and has a smaller outer diameter than the spool 6, and the annular leaf spring 7 that is interposed between one end of the spool 6 that is the opposite end of the leaf valve and the spring support portion 4g and presses the spool 6 in a direction of abutting on the leaf valve 3. In addition, in the present embodiment, the damping valve 1 includes the valve holding member 10 fitted in a sleeve 107a provided in the opening of the intermediate tube 107, the pilot passage 23 that guides upstream pressure of the port 2a to the back pressure chamber 5 inside the valve holding member 10 and the housing 4, the solenoid valve 24 provided in the pilot passage 23, and the solenoid 40 giving driving force to the solenoid valve.

Each part of the damping valve 1 will be described in detail below. The valve holding member 10 includes, as illustrated in FIG. 3, a large-diameter base portion 10a fitted in the sleeve 107a, a shaft portion 10b protruding rightward from the base portion 10a in FIG. 3 and having a screw portion (without symbol) at the right end of the outer circumference in FIG. 3, a hollow portion 10c formed to penetrate the base portion 10a and the shaft portion 10b in the axial direction to form part of the pilot passage 23, an orifice 10d as an orifice provided partway in the hollow portion 10c, and a plurality of passages 10e penetrating from the left end to the right end of the base portion 10a in FIG. 3.

Each passage 10e penetrates the base portion 10a and leads to the hollow portion 10c as described above, and further communicates with the inside of the extension side chamber 104 via the discharge passage 106 formed by the intermediate tube 107 via the hollow portion 10c. An opening on the right end side of the base portion 10a in the passage 10e in FIG. 3 communicates with the reservoir 108. That is, the shock absorber 100 is configured to discharge the hydraulic oil from the extension side chamber 104 via the discharge passage 106 and the passage 10e to the reservoir 108 when expanding or contracting. The extension side chamber 104 is upstream of the passage 10e. An opening on the left end side of the hollow portion 10c in FIG. 3 also communicates with the inside of the extension side chamber 104 via the discharge passage 106, in a similar manner to the passage 10e.

Figure 3:
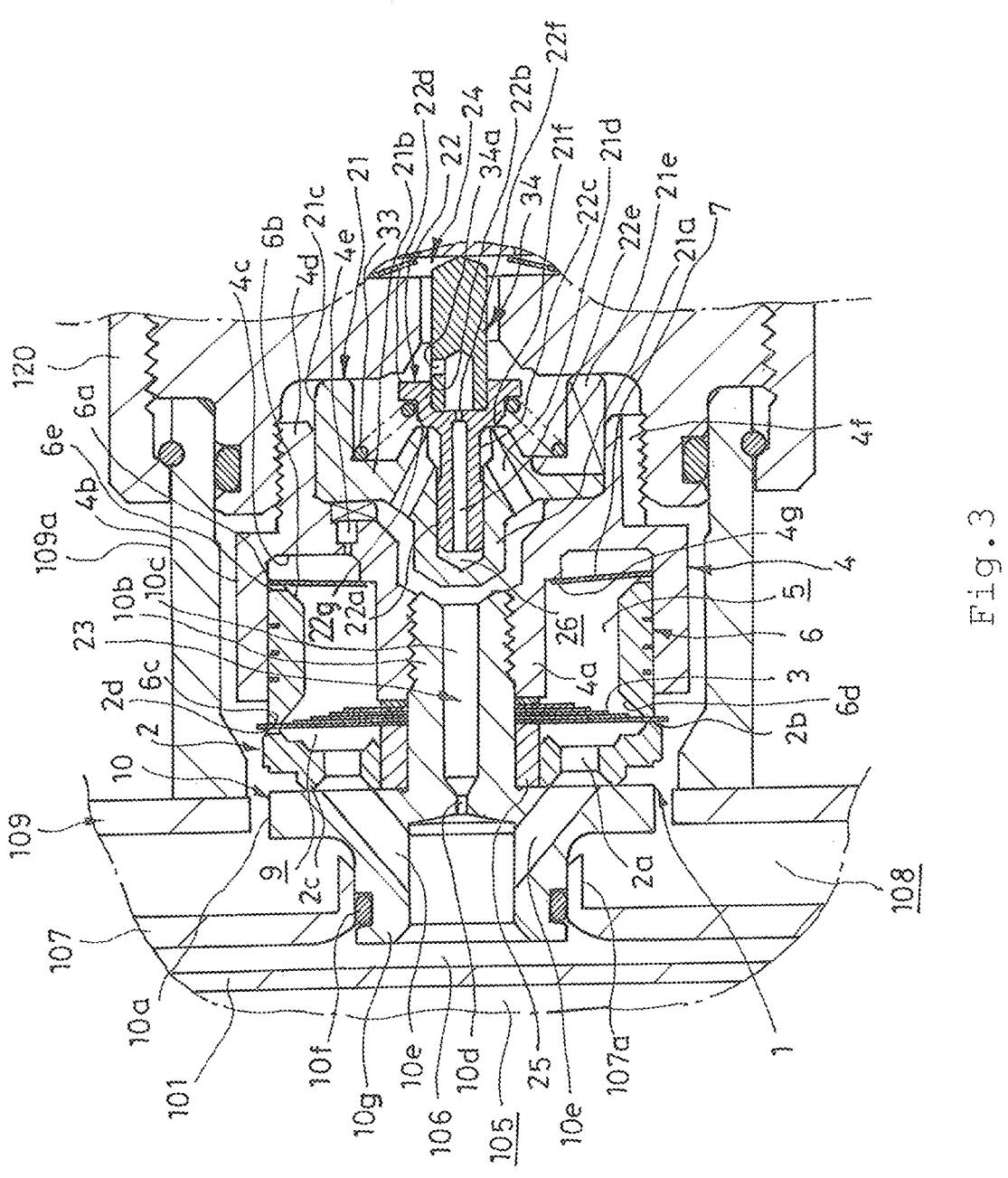
FIG. 3 is an enlarged view of a valve portion of the damping valve according to one embodiment of the present invention.

Note that a small-diameter portion 10g formed by reducing the diameter of the left side of the base portion 10a of the valve holding member 10 in FIG. 3 fits in the sleeve 107a. A seal ring 10f is attached to the outer circumference of the small-diameter portion 10g to seal with the sleeve 107a, thereby preventing the discharge passage 106 from leading to the reservoir 108 via the outer circumference of the base portion 10a.

Subsequently, the disk 2, which opens and closes the passage 10e by leaving and sitting on the base portion 10a, is stacked at the right end of the base portion 10a of the valve holding member 10 in FIG. 3. The annular disk 2 includes: the plurality of ports 2a penetrating the wall thickness in the axial direction; and the annular valve seat 2b provided on the back side on the opposite side of the valve holding member, surrounding the outer circumference of the ports 2a, and protruding to the back side. Furthermore, the disk 2 includes an annular protrusion 2c protruding from the end facing the base portion 10a of the valve holding member 10 to the base portion 10a side. The annular protrusion 2c faces the outer circumferential side of the passage 10e in the base portion 10a. When the disk 2 abuts on the base portion 10a, the annular protrusion 2c sits on the outer circumferential side of the passage 10e of the base portion 10a. Therefore, when the disk 2 abuts on the base portion 10a, the disk 2 blocks an exit end of the passage 10e. The port 2a is designed to give resistance to the flow of hydraulic oil passing through. As will be described later in detail, when the hydraulic oil passes through the passage 10e and moves to the back side of the disk 2 through the port 2a, a difference in pressure develops between the valve holding member side, which is the front side of the disk 2, and the back side. Note that in the damping valve 1 of the present embodiment, the annular protrusion 2c is provided in the disk 2, but the base portion 10a of the valve holding member 10 may be provided with a valve seat surrounding the outer circumference of the passage 10e.

The disk 2 is slidably attached to the outer circumference of an annular spacer 25 attached to the outer circumference of the shaft portion 10b of the valve holding member 10. The spacer 25 has an axial thickness thicker than the axial thickness of the inner circumference of the disk 2. The disk 2 can move along the outer circumference of the spacer 25 in both right-and-left directions, which are the axial direction in FIG. 3. Therefore, the disk 2 is assembled in a floating state with respect to the valve holding member 10, can leave and sit on the base portion 10a by approaching and leaving the valve holding member 10, and releases the passage 10e when leaving the base portion 10a. In addition, the valve seat 2b is provided with a notch orifice 2d. Instead of the notch orifice 2d, the orifice may be provided in the valve holding member 10 or the annular protrusion 2c of the disk 2.

Furthermore, the leaf valve 3 is stacked on the back side of the disk 2. The leaf valve 3 is a stacked leaf valve configured by stacking a plurality of annular plates. The inner circumference is assembled to the shaft portion 10b and sandwiched between the spacer 25 and the housing 4 screwed to the shaft portion 10b. Therefore, the leaf valve 3 can leave and sit on the valve seat 2b of the disk 2 with deflection on the outer circumferential side allowed. The outer diameter of the annular plate in the leaf valve 3 decreases in stages as stacked to the back side.

The inner circumference of the leaf valve 3 is stacked on the spacer 25, and the outer circumference sits on the valve seat 2b protruding from the back of the disk 2 to the leaf valve 3 side. Therefore, there is a space between the leaf valve 3 and the disk 2, and an intermediate chamber 9 is formed in this space. Note that the intermediate chamber 9 communicates with the passage 10e via the port 2a. Then, when the leaf valve 3 receives pressure acting in the inter-mediate chamber 9 via the port 2a, deflects, and leaves the valve seat 2b, an annular gap is formed between the leaf valve 3 and the disk 2, and the hydraulic oil that has passed the passage 10e and the port 2a can pass between the leaf valve 3 and the disk 2 and move to the reservoir 108. That is, even if the disk 2 is seated on the base portion 10a, if the leaf valve 3 deflects and leaves the valve seat 2b, the port 2a is opened and the hydraulic oil can move from the extension side chamber 104 to the reservoir 108.

Furthermore, when the leaf valve 3 deflects and the disk 2 is pushed up by the pressure received from the passage 10e, the disk 2 as a whole slides on the spacer 25 and leaves the base portion 10a. In this case, the hydraulic oil that has passed through the passage 10e is discharged to the reservoir 108 via an annular gap formed between the disk 2 and the base portion 10a. Note that the leaf valve 3 is configured as a stacked leaf valve in which a plurality of annular plates is stacked, and the number of annular plates is arbitrary.

The housing 4 is screwed to the right end in FIG. 1, which is the tip of the shaft portion 10b. Then, the spacer 25 assembled to the shaft portion 10b and the leaf valve 3 are sandwiched and fixed between the base portion 10a of the valve holding member 10 and the housing 4. Note that as described above, the disk 2 attached to the outer circumfer-ence of the spacer 25 is in a floating state fixed to the outer circumference of the spacer 25, and can move in the axial direction.

The housing 4 includes, as illustrated in FIG. 3, an inner tube 4a having a screw portion (without symbol) on the inner circumference and screwed to the shaft portion 10b of the valve holding member 10, an outer tube 4b facing the inner tube 4a with an annular gap, a flange-shaped bottom portion 4c protruding radially from the right end of the outer circumference of the inner tube 4a in FIG. 3 and connected to the right end of the outer tube 4b in FIG. 3, a tubular socket 4d that rises from the opposite side of the inner tube of the bottom portion 4c and has a screw portion (without symbol) on the outer circumference, a hole 4e that penetrates the bottom portion 4c and causes the annular gap between the inner tube 4a and the outer tube 4b to communicate with the inside of the socket 4d, and a notch groove 4f provided along the axial direction in the outer circumference of the socket 4d.

When screwed to the shaft portion 10b of the valve holding member 10, the inner tube 4a of the housing 4 cooperates with the base portion 10a of the valve holding member 10 to sandwich the spacer 25 and the leaf valve 3. The outer circumference of the inner tube 4a in the housing 4 has a large outer diameter at the right end in FIG. 3 that is the base end to form a step portion. The spring support portion 4g, which is an annular surface facing the back of the leaf valve 3, is provided at the step portion. The spring support portion 4g functions as a spring seat supporting the inner circumference of the leaf spring 7. The inside of the housing 4 is connected to the hollow portion 10c of the valve holding member 10, and communicates with the inside of the extension side chamber 104, which is upstream of the passage 10e, via the orifice 10d.

As illustrated in FIG. 3, the spool 6 is slidably inserted into the inner circumference of the outer tube 4b. The annular spool 6 includes a first-end outer circumferential portion 6a that is the outer circumferential portion of the first end on the opposite leaf valve side (right end in FIG. 3), a tapered portion 6b inclined to the second-end side inside the first-end outer circumferential portion 6a, a second-end outer circumferential portion 6c that is the outer circumfer-ential portion of the second end that is the leaf valve side end (left end in FIG. 3), and a tapered portion 6d inclined to the first end side inside the second-end outer circumferential portion 6c. The spool 6 includes a plurality of grooves 6e radially penetrating the first-end outer circumferential por-tion 6a, as illustrated in FIG. 3. Note that in the damping valve 1 of the present embodiment, three grooves 6e are provided in the circumferential direction of the spool 6 at equal intervals.

The spool 6 can move in the axial direction with respect to the housing 4, causes the second-end outer circumferen-tial portion 6c to abut on the circumferential portion on the back of the leaf valve 3, and cooperates with the housing 4 to form the back pressure chamber 5. The back pressure chamber 5 communicates with the inside of the socket 4*d* via the hole 4*e* provided in the bottom portion 4*c* of the housing 4. As described above, since the inside of the housing 4 communicates with the inside of the extension side chamber 104, the hydraulic oil discharged from the extension side chamber 104 is led to the back pressure chamber 5 via the orifice 10*d* and hole 4*e*. In this way, the pressure upstream of the passage 10*e* is reduced by the orifice 10*d* and introduced into the back pressure chamber 5.

Since the spool 6 includes the tapered portion 6*d* inside the second-end outer circumferential portion 6*c* of the spool 6 on which the outer circumference of the leaf valve 3 abuts, the spool 6 does not interfere even if the leaf valve 3 is a stacked leaf valve with the outer diameter decreasing in stages toward the back side. The design about the number of annular plates and the outer diameter of the leaf valve 3 can be changed arbitrarily, and providing the tapered portion 6*d* on the second-end side, which is the leaf valve side end of the spool 6, allows higher degree of flexibility in the selection of the number of annular plates and the outer diameter of the leaf valve 3.

In the damping valve 1 of the present embodiment, the leaf spring 7 is an annular disk spring. The inner circumference on the opposite side of the leaf valve is supported by the spring support portion 4*g* provided in the housing 4, and the outer circumference on the leaf valve side is supported by the first-end outer circumferential portion 6*a* of the spool 6. The outer diameter of the spring support portion 4*g* is smaller than the inner diameter of the spool 6. In a state where the leaf valve 3 sits on the valve seat 2*b* of the disk 2, the disk 2 sits on the base portion 10*a* of the valve holding member 10, and the spool 6 abuts on the leaf valve 3, the surface of the spring support portion 4*g* supporting the leaf spring 7 is disposed on the leaf valve side of the surface of the first-end outer circumferential portion 6*a* of the spool 6 supporting the leaf spring 7 in the axial direction of the spool 6. That is, in FIG. 3, the spring support portion 4*g* of the housing 4 is disposed leftward of the first-end outer circumferential portion 6*a* of the spool 6.

Therefore, the leaf spring 7 is interposed between the spool 6 and the spring support portion 4*g* in a deflected state with an initial deflection given, and always presses the spool 6 in a direction to abut on the leaf valve 3. The initial deflection amount of the leaf spring 7 can be set by setting the axial length of the spool 6 and the axial position of the spring support portion 4*g*. Since the leaf spring 7 needs to always press the spool 6 to prevent the spool from separating from the leaf valve 3, it is required at least to set the spring support portion 4*g* of the housing 4 closer to the leaf valve 3 in the axial direction than the first-end outer circumferential portion 6*a* of the spool 6. However, since the pressing force of the leaf spring 7 affects the valve opening pressure of the damping valve 1, the pressing force by which the leaf spring 7 presses the spool 6 is preferably as small as possible, and therefore it is desirable to reduce the initial deflection amount of the leaf spring 7.

Only the inner circumference on the opposite side of the leaf valve of the leaf spring 7 abuts on the spring support portion 4*g* facing the back of the leaf valve 3, and the inner circumference of the leaf spring 7 is not fixedly supported by the housing 4. Therefore, when the spool 6 moves in the axial direction separating from the disk 2, the pressing force given by the leaf spring 7 that is not fixedly supported to the spool 6 is smaller than the pressing force of the leaf spring when the inner circumference is fixed. Therefore, when the structure in which the leaf spring 7 is supported by the spring support portion 4*g* in this way is adopted, the apparent spring constant of the leaf spring 7 will be lower, and therefore the increase in the pressing force given by the leaf spring 7 to the spool 6 when the spool 6 moves in the direction separating from the disk 2 can be suppressed.

Furthermore, the tapered portion 6*b* provided inside the first-end outer circumferential portion 6*a* of the spool 6 allows the inner diameter of the first-end outer circumferential portion 6*a* to be large. The support diameter on the outer circumferential side of the leaf spring 7 is determined by the inner diameter of the first-end outer circumferential portion 6*a* of the spool 6. As the support diameter increases, the deflection amount of the leaf spring 7 caused by the movement of the spool 6 can be reduced more. Therefore, if the tapered portion 6*b* is provided inside the first-end outer circumferential portion 6*a* of the spool 6, the apparent spring constant of the leaf spring 7 can be lowered, and therefore the increase in the pressing force given by the leaf spring 7 to the spool 6 when the spool 6 moves in the direction separating from the disk 2 can be suppressed.

Figure 4:
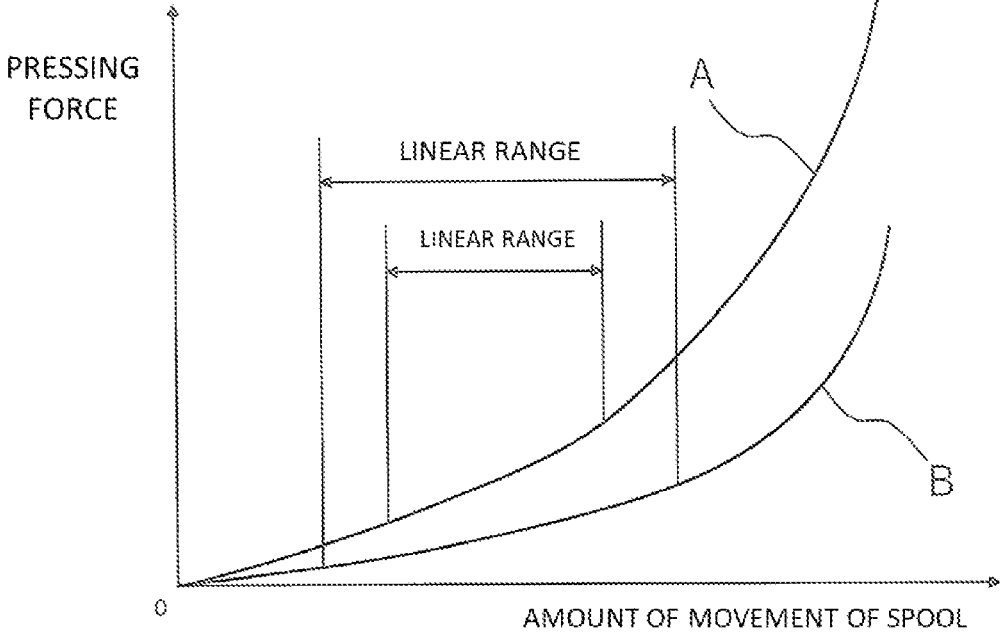
FIG. 4 is a diagram illustrating characteristics of pressing force of a leaf spring with respect to an amount of movement of a spool of the damping valve according to one embodiment of the present invention.

Note that the first-end outer circumferential portion 6*a* of the spool 6 is provided with the groove 6*e*. Even if the leaf spring 7 does not include any holes or grooves, the chamber on the leftward leaf valve side of the leaf spring 7 in FIG. 3 communicates with the chamber on the rightward opposite side of the leaf valve in FIG. 3 by the groove 6*e*, and therefore the leaf spring 7 does not divide the back pressure chamber 5. The groove 6*e* is provided to ensure a channel area that is large enough to prevent differential pressure between the chamber on the leaf valve side and the chamber on the opposite side of the leaf valve of the leaf spring 7 in the back pressure chamber 5. As illustrated in FIG. 4, the characteristics of magnitude of the pressing force the leaf spring 7 gives to the spool 6 for the amount of movement of the spool 6 can be changed by setting the circumferential width of the groove 6*e*. When the width of the groove 6*e* is narrowed, as illustrated by the characteristic line A in FIG. 4, the apparent spring constant of the leaf spring 7 shows a tendency to become larger, and the linear range appearing partway in the characteristic line A (range where the pressing force of the leaf spring 7 is proportional to the amount of movement of the spool 6) becomes narrow. When the width of the groove 6*e* is widened, as illustrated by the characteristic line B in FIG. 4, the apparent spring constant of the leaf spring 7 shows a tendency to become smaller, and the linear range appearing partway in the characteristic line B (range where the pressing force of the leaf spring 7 is proportional to the amount of movement of the spool 6) becomes wide. Since the channel area of the groove 6*e* needs to be ensured as described above, when the width of the groove 6*e* is to be narrowed, the number of grooves 6*e* to install may be increased, and when the width of the groove 6*e* is to be widened, the number of grooves 6*e* to install may be decreased. Therefore, according to the required specification for the damping valve 1, it is required at least to determine the characteristics of the pressing force to be given by the leaf spring 7 to the spool 6 and set the number of grooves 6*e* to install and the width as appropriate. Note that instead of providing the groove 6*e* in the spool 6 to avoid fragmentation of the back pressure chamber 5, the leaf spring 7 may be a perforated leaf spring.

As described above, since the hydraulic oil discharged from the extension side chamber 104 is led to the back pressure chamber 5 via the orifice 10*d* and hole 4*e*, the pressing force that pushes the leaf valve 3 toward the disk 2 acts on the back of the leaf valve 3 by the internal pressure of the back pressure chamber 5, other than the pressing force by the leaf spring 7 that presses the spool 6. That is, when the shock absorber 100 performs expansion and contraction operations, the pressure in the extension side chamber 104 acts on the disk 2 from the front side via the passage 10e, and the internal pressure of the back pressure chamber 5 and the pressing force by the leaf spring 7 acts from the back side via the leaf valve 3.

Note that the force of the value obtained by multiplying the back side pressure receiving area obtained by subtracting the area of a circle whose diameter is the outer diameter of the smallest-diameter annular plate stacked in the top row of the leaf valve 3 from the area of a circle whose diameter is the outer diameter of the spool 6 by the pressure of the back pressure chamber 5 acts on the leaf valve 3 to be pushed against the disk 2, and the force of the value obtained by multiplying the front side pressure receiving area obtained by subtracting the area of a circle whose diameter is the outer diameter of the spacer 25 from the area of a circle whose diameter is the inner diameter of the valve seat 2b by the pressure of the intermediate chamber 9 acts on the leaf valve 3 in a direction separating from the disk 2. Therefore, the ratio of the back side pressure receiving area to the front side pressure receiving area of the leaf valve 3 determines the pressure intensification ratio, which is the ratio of the valve opening pressure of the leaf valve 3 to the pressure within the back pressure chamber 5.

When the pressure within the intermediate chamber 9 is increased by the pressure within the extension side chamber 104 and the force to deflect the outer circumference of the leaf valve 3 rightward in FIG. 3 overcomes the internal pressure of the back pressure chamber 5 and the pressing force by the leaf spring 7, the leaf valve 3 deflects and leaves the valve seat 2b, forming a gap between the leaf valve 3 and the disk 2, and opening the passage 10e. In this embodiment, the inner diameter of the valve seat 2b is larger than the inner diameter of the annular protrusion 2c, and there is a difference between the pressure receiving area where the disk 2 receives pressure on the passage 10e side and the pressure receiving area where the disk 2 receives pressure on the intermediate chamber 9 side. If the differential pressure generated by the port 2a does not reach the valve opening pressure that causes the disk 2 to leave the base portion 10a of the valve holding member 10, the disk 2 will remain seated on the base portion 10a. Meanwhile, when the leaf valve 3 deflects to be in a valve open state and the differential pressure generated by the port 2a reaches the valve opening pressure that causes the disk 2 to leave the base portion 10a, the disk 2 will also leave the base portion 10a and open the passage 10e. That is, the pressure intensification ratio in the leaf valve 3 is set smaller than the pressure intensification ratio in the disk 2, which is the ratio of the valve opening pressure of the disk 2 to the pressure of the intermediate chamber 9, and the pressure in the extension side chamber 104 when the leaf valve 3 opens is lower than the pressure in the extension side chamber 104 when the disk 2 opens. That is, the valve opening pressure of the leaf valve 3 is set to be lower than the valve opening pressure of the disk 2.

Subsequently, a tubular valve seat member 21 is housed inside the right end of the socket 4d and the inner tube 4a in the housing 4 in FIG. 3. The valve seat member 21 includes a small-diameter cylindrical portion 21a having a tubular shape with a bottom, a flange portion 21b protruding outward from the outer circumference at the end that is the right end of the small-diameter cylindrical portion 21a in FIG. 3, a large-diameter cylindrical portion 21c extending from the outer circumference of the flange portion 21b toward the opposite side of the small-diameter cylindrical portion 21a, a through-hole 21d opening diagonally from the side of the small-diameter cylindrical portion 21a to the inner circumference of the flange portion 21b, a notch 21e radially penetrating the large-diameter cylindrical portion 21c and causing the inside and outside of the large-diameter cylindrical portion 21c to communicate with each other, and an annular valve seat 21f protruding from the inner circumference at the right end of the flange portion 21b in the axial direction in FIG. 3.

The valve seat member 21 is housed in the housing 4 with the large-diameter cylindrical portion 21c fitted in the socket 4d of the housing 4. Note that the inside of the valve seat member 21 communicates with the reservoir 108 via the notch 21e and the notch groove 4f provided in the socket 4d. The outer diameter of the small-diameter cylindrical portion 21a is smaller than the inner diameter of the inner tube 4a of the housing 4. The inside of the valve seat member 21 communicates with the extension side chamber 104 via the through-hole 21d, the hollow portion 10c of the valve holding member 10, and the orifice 10d.

Subsequently, a valve body 22 is slidably inserted into the small-diameter cylindrical portion 21a of the valve seat member 21. In detail, the valve body 22 includes a small-diameter portion 22a on the left end side in FIG. 3 that is the valve seat member side that is slidably inserted into the small-diameter cylindrical portion 21a, a large-diameter portion 22b on the right end side in FIG. 3 that is the opposite side of the valve seat member, an annular recess 22c provided between the small-diameter portion 22a and the large-diameter portion 22b, a flange-shaped spring seat 22d provided on the outer circumference at the opposite valve seat member side end, a communication passage 22e penetrating from the tip to the rear end of the valve body 22, and an orifice 22f provided partway in the communication passage 22e.

The recess 22c of the valve body 22 always faces the through-hole 21d such that the valve body 22 does not block the through-hole 21d when the valve body 22 moves with respect to the valve seat member 21 within an allowable range in the axial direction.

In the valve body 22, as described above, the outer diameter on the opposite side of the valve seat member is larger with the recess 22c as a boundary. An annular valve portion 22g is provided on the left end of the large-diameter portion 22b in FIG. 3 to face the valve seat 21f of the valve seat member 21. The movement of the valve body 22 in the axial direction with respect to the valve seat member 21 causes the valve portion 22g to leave and sit on the valve seat 21f.

Furthermore, a coil spring 33 that presses the valve body 22 to the opposite side of the valve seat member is interposed between the spring seat 22d and the flange portion 21b. The valve body 22 is always pressed to the opposite side of the valve seat member by the coil spring 33. In this way, while the valve body 22 is pressed by the coil spring 33 in a direction separating from the valve seat member 21, the valve body receives driving force from the solenoid 40 in a direction of sitting on the valve seat member 21

In this way, the valve body 22, the valve seat member 21, the coil spring 33, and the solenoid 40 constitute the solenoid valve 24. When the valve portion 22g sits on the valve seat 21f, the solenoid valve 24 closes. The solenoid valve 24 breaks the communication between the hollow portion 10c of the valve holding member 10 and the inside of the valve seat member 21 in the valve closed state, and allows the hollow portion 10c to communicate with the inside of the valve seat member 21 in the valve open state.

Therefore, when the solenoid valve 24 opens, the extension side chamber 104 communicates with the reservoir 108 via the hollow portion 10c, the orifice 10d, the through-hole 21d, the inside of the valve seat member 21, the notch 21e, and the notch groove 4f. In this way, in the present embodiment, the hollow portion 10c, the orifice 10d, the through-hole 21d, the inside of the valve seat member 21, the notch 21e, and the notch groove 4f form the pilot passage 23. The downstream portion from the orifice 10d in the pilot passage 23 leads to the back pressure chamber 5 via the hole 4e of the housing 4, and the pressure downstream of the orifice 10d of the pilot passage 23 can be adjusted by controlling the valve opening pressure of the solenoid valve 24.

The valve opening pressure of the solenoid valve 24 is controlled by the solenoid 40 described later, and the pressure in the back pressure chamber 5, which is the pressure on the back of the leaf valve 3, can be adjusted by the current amount to be applied to the solenoid 40. Since the pressure in the back pressure chamber 5 acts on the back of the leaf valve 3, the damping valve 1 of the present embodiment can adjust the valve opening pressure of the leaf valve 3 by adjusting the current amount to be applied to the solenoid 40, whereby the damping force generated by the shock absorber 100 can be changed in magnitude.

Note that, in this case, the valve body 22 is pressed in a direction away from the valve seat member 21 by using the coil spring 33, but an elastic material can be used that can exert the pressing force, besides the coil spring 33. Furthermore, a plunger 34 is fitted in the large-diameter portion 22b of the valve body 22.

When the valve body 22 is inserted into the small-diameter cylindrical portion 21a of the valve seat member 21, the valve body forms a space 26 within the small-diameter cylindrical portion 21a on the tip side of the through-hole 21d. The space 26 communicates with the outside of the solenoid valve 24 via the communication passage 22e provided in the valve body 22, the orifice 22f, and a through hole 34a provided in the plunger 34. With this configuration, when the valve body 22 moves in the axial direction, which is the left-right direction with respect to the valve seat member 21 in FIG. 1, the space 26 functions as a dashpot to inhibit the steep displacement of the valve body 22, and can inhibit oscillatory movement of the valve body 22.

Each part in the damping valve 1 configured in this way is housed in a sleeve 109a attached to an opening provided in the outer tube 109 of the shock absorber 100, and is fixed to the shock absorber 100 by screwing the solenoid 40 to a nut 120 rotatably attached to the sleeve 109a.

As illustrated in FIG. 5, the solenoid 40 includes: the coil 41; the first fixed iron core 43 disposed on an axial first-end side of the coil 41; the second fixed iron core 44 disposed on an axial second-end side of the coil 41 with a gap from the first fixed iron core 43; the tubular first movable iron core 45 disposed between the first fixed iron core 43 and the second fixed iron core 44 and attracted to the first fixed iron core 43 by passing a current through the coil 41: the second movable iron core 46 having a tubular shape with a bottom, slidably inserted into the first movable iron core 45, disposed between the first fixed iron core 43 and the second fixed iron core 44 with a bottom portion 46b facing the second fixed iron core 44, and attracted to the second fixed iron core 44 by passing a current through the coil 41; and the spring 47 interposed between the first movable iron core 45 and the first fixed iron core 43, and pressing the first movable iron core 45 to the second fixed iron core side.

The coil 41 is tubular, resin-molded, and disposed in the outer circumference of the first movable iron core 45 and the second movable iron core 46. A tubular filler ring 42 including a non-magnetic material is fitted in the inner circumference of the coil 41. The filler ring 42 includes an annular flange 42a protruding inward from the inner circumference on the left-end side in FIG. 5 and an annular groove 42b provided on the inner circumference at the right end in FIG. 5.

The first fixed iron core 43 abuts on the right end that is one end of the coil 41 in FIG. 5, and is fitted in the inner circumference at the right end of the filler ring 42 in FIG. 5. Specifically, the first fixed iron core 43 includes a magnetic material, and includes a disk-shaped base 43a that abuts on the right end of the resin-molded coil 41 in FIG. 5, and an annular fitting portion 43b that rises from the base 43a and is fitted in the inner circumference of the filler ring 42.

The second fixed iron core 44 abuts on the left end that is the second end of the coil 41 in FIG. 5, and is press-fitted in the inner circumference at the left end of the filler ring 42 in FIG. 5 with a gap from the first fixed iron core 43. Specifically, the second fixed iron core 44 includes a magnetic material, and includes an annular base 44a that abuts on the left end of the resin-molded coil 41 in FIG. 5, a tubular case portion 44b that rises from the outer circumference of the base 44a, and a tubular press-fit portion 44c that rises from the inner circumferential side of the base 44a and is press-fitted in the inner circumference of the filler ring 42.

The coil 41 and the filler ring 42 fitted in the inner circumference of the coil 41 are housed in the inner circumference of the case portion 44b. The first fixed iron core 43 is housed in the inner circumference on the right end side of the case portion 44b in FIG. 5. By caulking the right end of the case portion 44b in FIG. 5 from the outer circumference, the first fixed iron core 43 is gripped by and fixed to the case portion 44b. When the first fixed iron core 43 is fixed to the case portion 44b, the coil 41 and the filler ring 42 are sandwiched between the base 43a of the first fixed iron core 43 and the base 44a of the second fixed iron core 44, the fitting portion 43b and the press-fit portion 44c are fitted in the inner circumference of the filler ring 42, and the coil 41 is fitted in the case portion 44b. Therefore, the coil 41 and the filler ring 42 are housed between the first fixed iron core 43 and the second fixed iron core 44 while axially and radially constrained.

A tapered chamfer 44d is provided on the outer circumference at the right end in FIG. 5 that is the tip of the press-fit portion 44c of the second fixed iron core 44, and an annular gap is formed between the chamfer and the filler ring 42. A seal ring 50 is housed in the annular gap. The seal ring 50 adheres to the flange 42a provided in the inner circumference of the filler ring 42 and the chamfer 44d of the press-fit portion 44c to seal between the second fixed iron core 44 and the filler ring 42. Furthermore, a seal ring 51 that adheres to the outer circumference of the fitting portion 43b of the first fixed iron core 43 is attached to the inside of the annular groove 42b provided on the inner circumference at the right end of the filler ring 42 in FIG. 5. The seal ring 51 seals between the first fixed iron core 43 and the filler ring 42.

The first movable iron core 45 is slidably inserted into the inner circumference of the filler ring 42 and between the fitting portion 43b of the first fixed iron core 43 and the press-fit portion 44c of the second fixed iron core 44.

A connecting tube 44e that protrudes leftward and screws into the outer circumference of the socket 4d of the housing 4 in the damping valve 1 is provided at the left end of the base 44a of the second fixed iron core 44 in FIG. 1.

The first movable iron core 45 includes a magnetic material and includes: a sliding contact tube 45a that slides and contacts the inner circumference of the filler ring 42; an annular bottom portion 45b protruding from the right end in FIG. 5 that is one end of the sliding contact tube 45a toward the inner circumference, the annular bottom portion 45b facing the left end in FIG. 5 of the fitting portion 43b of the first fixed iron core 43; and an annular protrusion 45c protruding from the annular bottom portion 45b toward the first fixed iron core 43, the annular protrusion 45c leaving and sitting on the first fixed iron core 43. The inner diameter of the annular bottom portion 45b is widened on the right end side that is one end side in FIG. 5, and a step portion 45d is formed in the inner circumference of the annular bottom portion 45b.

In the sliding contact tube 45a of the first movable iron core 45, the outer circumference slides and contacts the inner circumference of the filler ring 42 as described above, and the left end that is the second end in FIG. 5 faces the right end of the press-fit portion 44c of the second fixed iron core 44 in FIG. 5 in the axial direction.

The annular protrusion 45c is provided on the outer circumferential side of the annular bottom portion 45b, and the outer diameter of the annular protrusion 45c is smaller than the diameter of the annular bottom portion 45b. Therefore, when the annular protrusion 45c abuts on the left end of the fitting portion 43b of the first fixed iron core 43 in FIG. 5, an annular gap is formed on each of the inner circumferential side and the outer circumferential side of the annular protrusion 45c, between the annular bottom portion 45b of the first movable iron core 45 and the fitting portion 43b of the first fixed iron core 43. The axial length of the annular protrusion 45c is from 0.13 mm to 0.15 mm. The annular gap thickness in the inner and outer circumference of the annular protrusion 45c formed when the first movable iron core 45 abuts on the left end of the fitting portion 43b of the first fixed iron core 43 in FIG. 5 ranges from 0.13 mm to 0.15 mm.

The axial length from the left end in FIG. 5 that is the second end of the sliding contact tube 45a of the first movable iron core 45 to the abutment surface of the annular protrusion 45c in the annular bottom portion 45b on the fitting portion 43b of the first fixed iron core 43 is shorter than the axial distance between the fitting portion 43b of the first fixed iron core 43 and the press-fit portion 44c of the second fixed iron core 44. Therefore, the first movable iron core 45 can be displaced in the axial direction while the movement is guided by the filler ring 42 between the first fixed iron core 43 and the second fixed iron core 44.

Note that to prevent the sliding contact tube 45a from interfering with the flange 42a of the filler ring 42 when the first movable iron core 45 separates from the first fixed iron core 43 and moves to the second fixed iron core side, the outer circumference at the second end of the sliding contact tube 45a is provided with a tapered chamfer 45e.

Furthermore, a tubular spring seat 52 including a non-magnetic material is fitted in the inner circumference of the annular bottom portion 45b of the first movable iron core 45. The spring seat 52 includes a flange 52a in the outer circumference at the right end in FIG. 5, and an annular spring support portion 52b protruding inward from the inner circumference at the left end in FIG. 5. s described above, when the spring seat 52 is fitted in the inner circumference of the annular bottom portion 45b, the flange 52a abuts on the step portion 45d formed in the inner circumference of the annular bottom portion 45b, regulating leftward relative movement in FIG. 5 that is the second-end side with respect to the first movable iron core 45. Note that the spring seat 52 may be attached to the first movable iron core 45 by press-fit or screwed. The spring seat 52 may include a magnetic material, but if the spring seat includes a non-magnetic material, a magnetic flux can flow exclusively in the sliding contact tube 45a with which the first movable iron core 45 slides and contacts the second movable iron core 46, and attraction given to the first movable iron core 45 and the second movable iron core 46 of the solenoid 40 is not impaired. Note that if the spring seat 52 includes a magnetic material, the spring seat 52 and the first movable iron core 45 may be configured as an integral one part.

The spring 47 is interposed between the spring support portion 52b provided in the inner circumference of the spring seat 52 and the base 43a of the first fixed iron core 43 in a compressed state to always press the first movable iron core 45 in an axial direction of separating from the first fixed iron core 43. The first end of the spring 47 is inserted into the inner circumference of the fitting portion 43b, and the second end is inserted into the spring seat 52. The spring always presses the spring seat 52 in the axial direction separating from the first fixed iron core 43. The inner diameter of the spring seat 52 and the inner diameter of the fitting portion 43b are almost the same. The spring 47 is prevented from radial displacement by the spring seat 52 and the fitting portion 43b.

Since the spring seat 52 pressed by the spring 47 is fitted in the inner circumference of the first movable iron core 45 and the flange 52a abuts on the step portion 45d of the inner circumference of the annular bottom portion 45b, the pressing force of the spring 47 is transmitted to the first movable iron core 45 via the spring seat 52. Therefore, the first movable iron core 45 is always pressed by the spring 47 in a direction separating from the first fixed iron core 43 in the axial direction, that is, to the second movable iron core 46 side.

Since the spring seat 52 receives the pressing force of the spring 47 and causes the flange 52a to abut on the step portion 45d, the spring seat does not separate even without being press-fitted in the first movable iron core 45, but may be press-fitted in the inner circumference of the first movable iron core 45, as described above.

The second movable iron core 46 is tubular with a bottom, includes a magnetic material, includes a tubular portion 46a and a bottom portion 46b closing the left end of the tubular portion 46a in FIG. 5, and causes the outer circumference of the tubular portion 46a to slidably contact the inner circumference of the sliding contact tube 45a of the first movable iron core 45. Note that the inner diameter of the tubular portion 46a is larger than the outer diameter of the spring seat 52 of the first movable iron core 45. Therefore, the second movable iron core 46 is guided to move by the sliding contact tube 45a of the first movable iron core 45 that is in sliding contact with the tubular portion 46a, and can relatively move in the axial direction with respect to the first movable iron core 45. Since the first movable iron core 45 causes the outer circumference of the sliding contact tube 45a to slide and contact the filler ring 42, both the first movable iron core 45 and the second movable iron core 46 can move in the axial direction without deviating from the axis of the filler ring 42. Note that the outer circumference of the bottom portion 46b of the second movable iron core 46 is always in contact with the inner circumference of the press-fit portion 44c of the second fixed iron core 44.

Since an annular gap is formed between the tubular portion 46a and the spring seat 52, the space surrounded by the tubular portion 46a of the second movable iron core 46 and the sliding contact tube 45a of the first movable iron core 45 and the spring seat 52 is not sealed. The bottom portion 46b of the second movable iron core 46 is provided with a communication hole 46c that causes the inside and outside of the second movable iron core 46 to communicate with each other, and the inside of the second movable iron core 46 that communicates with the inside of the spring seat 52 is also not sealed.

Therefore, the second movable iron core 46 can smoothly move with respect to the first movable iron core 45 in the axial direction, and the first movable iron core 45 can also move smoothly with respect to the filler ring 42 and the second movable iron core 46 in the axial direction.

The spring 47 presses the first movable iron core 45 to the second fixed iron core side. When the first movable iron core 45 and the second movable iron core 46 approach in the axial direction and a disk spring 48 is compressed, the disk spring 48 exerts resilient force to regulate further approach between the first movable iron core 45 and the second fixed iron core 44. When the second movable iron core 46 approaches the second fixed iron core 44 in the axial direction and a disk spring 49 is compressed, the disk spring 49 exerts resilient force to regulate further approach of the second movable iron core 46 to the second fixed iron core 44. Note that instead of the disk springs 48 and 49, an elastic body such as a wave washer or rubber may be provided. A member other than the elastic body may be provided if it is possible to regulate the approach between the first movable iron core 45 and the second movable iron core 46, and the approach between the second movable iron core 46 and the second fixed iron core 44.

The first fixed iron core 43, the second fixed iron core 44, the first movable iron core 45, and the second movable iron core 46 each include a magnetic material, and form a magnetic path P in the solenoid 40, as illustrated in FIG. 5. That is, the magnetic path P passes through a sliding contact portion between the sliding contact tube 45a of the first movable iron core 45 and the tubular portion 46a of the second movable iron core 46.

When a current passes through the coil 41, the magnetic field generated by the coil 41 goes through the first fixed iron core 43, the second fixed iron core 44, the first movable iron core 45, and the second movable iron core 46, and returns to the coil 41. Therefore, when a current passes through the coil 41, the first movable iron core 45 is attracted to the first fixed iron core 43 disposed on the right side in FIG. 5, and the second movable iron core 46 is attracted to the second fixed iron core 44 disposed on the left side in FIG. 5. That is, when a current passes through the coil 41 in the solenoid 40, the first movable iron core 45 and the second movable iron core 46 are attracted in a direction separating from each other in the axial direction.

After the solenoid 40 configured in this way is assembled to the damping valve 1 by screwing the housing 4 to the second fixed iron core 44, the screw portion (without symbol) provided in the outer circumference at the left end in FIG. 5 of the second fixed iron core 44 is screwed to the nut 120 attached to the sleeve 109a of the outer tube 109 of the shock absorber 100, and is attached to the shock absorber 100. When the second fixed iron core 44 is attached in this way, since all components of the solenoid 40 are housed in the second fixed iron core 44, the solenoid 40 can be attached to the shock absorber 100.

When the solenoid 40 is attached to the shock absorber 100 in this way, the bottom portion 46b of the second movable iron core 46 abuts on the plunger 34 attached to the rear end of the valve body 22 in the solenoid valve 24.

Therefore, the driving force generated by the solenoid 40 is transmitted to the valve body 22 via the plunger 34. While the valve body 22 is pressed by the coil spring 33 in the valve opening direction, the valve body receives the driving force of the solenoid 40 in the valve closing direction. Therefore, when the driving force of the solenoid 40 is adjusted, it is possible to adjust the pressure when the valve body 22 separates from the valve seat member 21 by the pressure received from the pilot passage 23, that is, the valve opening pressure of the solenoid valve 24. Since the pressure upstream of the solenoid valve 24 of the pilot passage 23 and downstream of the orifice 10d is equal to the valve opening pressure of the solenoid valve 24, the pressure of the back pressure chamber 5 is also equal to the valve opening pressure of the solenoid valve 24. Therefore, by adjusting the driving force of the solenoid 40, the pressure within the back pressure chamber 5 can be controlled.

Figure 6:
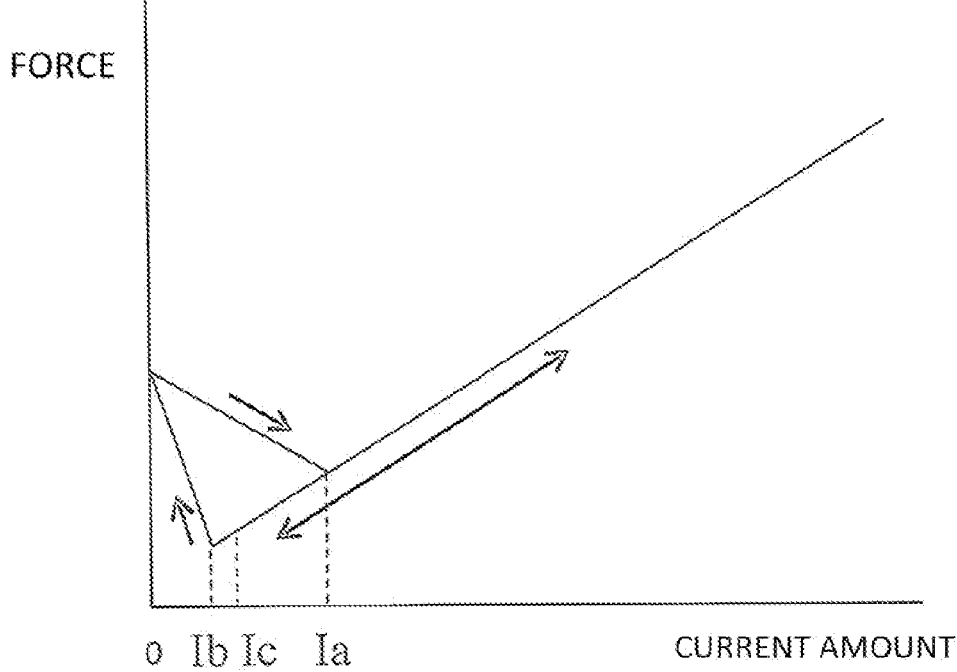
FIG. 6 is a diagram illustrating characteristics of driving force generated by the solenoid with respect to a current amount applied to the solenoid of the damping valve according to one embodiment of the present invention.

Subsequently, FIG. 6 illustrates the relationship between the current amount supplied to the solenoid 40 and the force applied by the solenoid 40 to the valve body 22 in the solenoid valve 24. In FIG. 6, the current amount Ia is the minimum current amount required to adsorb the first movable iron core 45 separated from the first fixed iron core 43 to the first fixed iron core 43, and the current amount Ib is the minimum current amount required to maintain the adsorption state of the first fixed iron core 43 and the first movable iron core 45 after the first movable iron core 45 is adsorbed to the first fixed iron core 43. Note that the current amount Ic will be described later. Note that each figure in which the solenoid 40 is illustrated illustrates a state in which a current is supplied to the coil 41 and the first movable iron core 45 is adsorbed to the first fixed iron core 43.

To begin with, when the current amount supplied to the coil 41 is zero, that is, when no current passes through the solenoid 40, the first movable iron core 45 is pushed leftward in FIG. 5 by the pressing force of the spring 47 and hits the second movable iron core 46 via the disk spring 48, and the second movable iron core 46 is pushed leftward together with the valve body 22. In this way, when no current passes through the solenoid 40, the valve body 22 receives leftward force by the spring 47 via the second movable iron core 46, the disk spring 48, and the first movable iron core 45. That is, when no current passes through the solenoid 40, the solenoid 40 applies leftward force caused by the pressing force of the spring 47 to the valve body 22.

Next, when the current amount supplied to the solenoid 40 is increased, the rightward force in FIG. 5 that attracts the first movable iron core 45 to the first fixed iron core 43 increases, and the leftward force in FIG. 5 that attracts the second movable iron core 46 to the second fixed iron core 44 also increases. In such a case, in the region where the current amount supplied to the solenoid 40 is less than the current amount Ia, the pressing force of the spring 47 is transmitted to the valve body 22, but part of the force of the spring 47 that presses the first movable iron core 45 leftward is offset by the force that attracts the first movable iron core 45 leftward rightward (first fixed iron core 43 side). Therefore, in the region where the current amount is less than the current amount Ia, the leftward force applied by the solenoid 40 to the valve body 22 decreases as the current amount supplied to the solenoid 40 increases.

Meanwhile, in a case where the current amount supplied to the solenoid 40 increases, in the region where the current amount is the current amount Ia or more, the first movable iron core 45 is attracted and adsorbed by the first fixed iron core 43 against the pressing force of the spring 47. In such a state, the pressing force of the spring 47 is not transmitted to the second movable iron core 46, and only the force that attracts the second movable iron core 46 to the second fixed iron core 44 acts in the direction of pushing down the valve body 22. Since the leftward force in FIG. 5 that attracts the second movable iron core 46 increases in proportion to the current amount supplied to the solenoid 40, in the region where the current amount supplied to the solenoid 40 is the current amount Ia or more, as the current amount supplied to the solenoid 40 increases, the leftward force applied by the solenoid 40 to the valve body 22 increases in proportion to the current amount.

Conversely, when the current amount supplied to the solenoid 40 is decreased from the state where the first movable iron core 45 is adsorbed to the first fixed iron core 43 and the pressing force of the spring 47 is not transmitted to the second movable iron core 46, the rightward force in FIG. 5 that attracts the first movable iron core 45 to the first fixed iron core 43 decreases, and the leftward force in FIG. 5 that attracts the second movable iron core 46 to the second fixed iron core 44 also decreases. Even in such a case, in the region where the current amount supplied to the solenoid 40 is the current amount Ib or more, the state in which the first movable iron core 45 is adsorbed to the first fixed iron core 43 and the pressing force of the spring 47 is not transmitted to the second movable iron core 46 is maintained. Therefore, in the region where the current amount supplied to the solenoid 40 is the current amount Ib or more, as the current amount supplied to the solenoid 40 decreases, the leftward force applied by the solenoid 40 to the valve body 22 decreases in proportion to the current amount.

Meanwhile, in the case where the current amount supplied to the solenoid 40 is decreased from the state where the first movable iron core 45 is adsorbed to the first fixed iron core 43 and the pressing force of the spring 47 is not transmitted to the second movable iron core 46, in the region where the current amount becomes less than the current amount Ib, the pressing force of the spring 47 releases the adsorption state of the first movable iron core 45 and the first fixed iron core 43, and the pressing force of the spring 47 is transmitted to the second movable iron core 46. Therefore, in the region where the current amount is less than the current amount Ib, as the current amount supplied to the solenoid 40 decreases, the leftward force in FIG. 5 applied by the solenoid 40 to the valve body 22 increases.

As can be seen from FIG. 6, Ib, which is the minimum current amount required to maintain the adsorption of the first movable iron core 45 and the first fixed iron core 43, is smaller than the current amount Ia, which is the minimum current amount required to adsorb the separated first movable iron core 45 to the first fixed iron core 43 (Ia>Ib). Therefore, the characteristic of the force applied by the solenoid 40 to the valve body 22 with respect to the current amount supplied to the solenoid 40 has hysteresis. Note that in FIG. 6, in order to facilitate understanding, the region where the current amount supplied to the solenoid 40 is small is exaggerated.

In the present embodiment, when the current amount supplied to the solenoid 40 is controlled to control the force applied by the solenoid 40 to the valve body 22, after once supplying a current equal to or larger than the current amount Ia and adsorbing the first movable iron core 45 to the first fixed iron core 43, the current amount supplied to the solenoid 40 is controlled in a range of the current amount Ic or more, which is larger than the current amount Ib. Once the first movable iron core 45 is adsorbed to the first fixed iron core 43, unless the current amount supplied to the solenoid 40 becomes less than Ib, the first movable iron core 45 will not separate from the first fixed iron core 43, and therefore the current amount Ic may be less than the current amount Ia as long as the current amount Ic is larger than the current amount Ib. Accordingly, in normal times when the current amount passing through the solenoid 40 is controlled, the state where the first movable iron core 45 is adsorbed to the first fixed iron core 43 is maintained. Therefore, the current amount supplied to the solenoid 40 and the leftward force applied by the solenoid 40 to the valve body 22 in FIG. 5 are in a proportional relationship, and the force increases as the current amount supplied to the solenoid 40 increases.

In normal times (during control), the force applied by the solenoid 40 to the valve body 22 caused by the magnetic force generated by the passage of current through the solenoid 40 is referred to as "driving force" of the solenoid 40. That is, the driving force of the solenoid 40 is controlled by controlling the current amount supplied to the solenoid 40. In the present embodiment, the current amount supplied to the solenoid 40 and the driving force applied to the valve body 22 by the solenoid 40 have a proportional relationship. The driving force increases as the supply current amount increases, and the driving force decreases as the supply current amount decreases.

Meanwhile, at the time of failure when the passage of current through the solenoid 40 is cut off, which is the same situation as when no current passes, the valve body 22 is pressed leftward in FIG. 5 by the spring 47 of the solenoid 40, and the pressing force is determined in advance according to the specification of the spring 47 such as the spring constant. The direction of the pressing force of the spring 47 that presses the valve body 22 at the time of failure (when no current passes) is the same as the direction of the driving force applied to the valve body 22 in normal times. Note that the pressing force of the spring 47 when the passage of current to the solenoid 40 is cut off is larger than the pressing force by which the coil spring 33 separates the valve body 22 from the valve seat member 21. Therefore, the solenoid 40 can exert the driving force to cause the valve body 22 to sit on the valve seat member 21 against the coil spring 33 even when no current passes.

In this way, in normal times, the driving force of the solenoid 40 is controlled such that the current amount supplied to the coil 41 of the solenoid 40 is larger than or equal to the current amount Ic, and the driving force increases as the current amount increases. That is, when the current amount to the solenoid 40 increases, the driving force of the solenoid 40 pushing the valve body 22 in the direction of closing the valve against the coil spring 33 increases, and thus the valve opening pressure of the solenoid valve 24 increases. Therefore, in normal times, when the current amount passing through the solenoid 40 is the current amount Ic, the valve opening pressure of the solenoid valve 24 is the smallest, the back pressure chamber 5 has the lowest pressure, and the valve opening pressure of the leaf valve 3 is the lowest. Meanwhile, when the current amount passing through the solenoid 40 becomes maximum, the valve opening pressure of the solenoid valve 24 becomes highest, the back pressure chamber 5 has the highest pressure, and the valve opening pressure of the leaf valve 3 becomes highest. Note that the maximum current amount passing through the solenoid 40 is appropriately determined according to the specifications of the coil 41, the power supply, and the like.

At the time of failure, as described above, the solenoid 40 transfers the pressing force of the spring 47 to the valve body 22 to give the driving force opposite the coil spring 33. Therefore, at the time of failure, since the valve body 22 is pressed against the valve seat member 21 with force of the pressing force of the spring 47 minus the pressing force of the coil spring 33, the valve opening pressure of the solenoid valve 24 is determined according to the specifications of the spring 47 and the coil spring 33 such as the spring constant. Therefore, even at the time of failure, the valve opening pressure of the solenoid valve 24 can be set in advance, and the valve opening pressure of the leaf valve 3 can be arbitrarily set by setting the pressure of the back pressure chamber 5 to the previously set valve opening pressure.

Here, the solenoid 40 according to the present embodiment includes: the coil 41; the first fixed iron core 43 disposed on an axial first-end side of the coil 41; the second fixed iron core 44 disposed on an axial second-end side of the coil 41 with a gap from the first fixed iron core 43; the tubular first movable iron core 45 disposed between the first fixed iron core 43 and the second fixed iron core 44, and attracted to the first fixed iron core 43 by passing a current through the coil 41; the second movable iron core 46 having a tubular shape with a bottom, slidably inserted into the first movable iron core 45, disposed between the first fixed iron core 43 and the second fixed iron core 44 with the bottom portion 46b facing the second fixed iron core 44, and attracted to the second fixed iron core 44 by passing a current through the coil 41; and the spring 47 interposed between the first movable iron core 45 and the first fixed iron core 43, and pressing the first movable iron core 45 to the second fixed iron core 44 side.

In the solenoid 40 of the present embodiment configured in this way, the second movable iron core 46 is slidably inserted into the first movable iron core 45, and the magnetic path P goes through the sliding contact portion between the sliding contact tube 45a of the first movable iron core 45 and the tubular portion 46a of the second movable iron core 46, and the sliding contact portion between the press-fit portion 44c of the second fixed iron core 44 and the left end outer circumference in FIG. 5 of the tubular portion 46a of the second movable iron core 46.

In the solenoid 40 of the present embodiment, instead of joining the second fixed iron core 44 and the filler ring 42 by brazing, the filler ring 42 is press-fitted in the outer circumference of the annular press-fit portion 44c protruding from the base 44a of the second fixed iron core 44 to the first fixed iron core side, and is fixed to the second fixed iron core 44.

Figure 8:
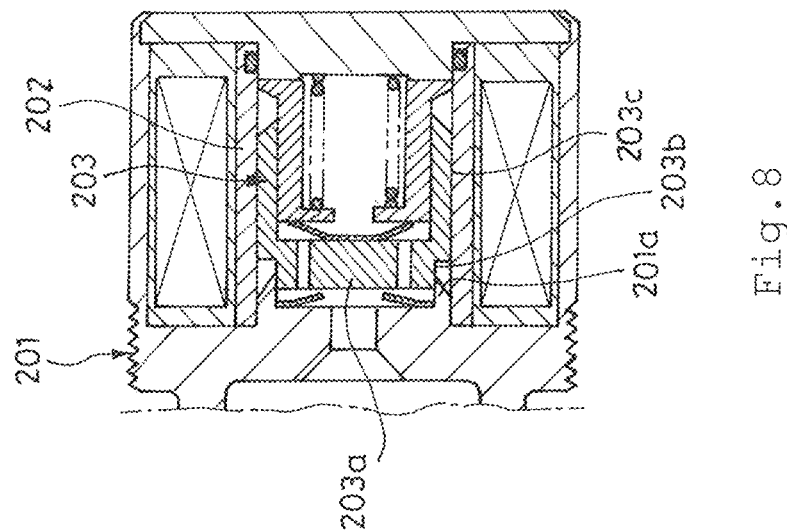
FIG. 8 is a diagram illustrating structure of a solenoid for making the conventional solenoid less expensive.

Since the first movable iron core 45 is disposed in the outer circumference, not the second movable iron core 46 that is in sliding contact with the inner circumference of the press-fit portion 44c, the outer circumference of the bottom portion 46b at the left end in FIG. 5 of the second movable iron core 46 does not need to be provided with an annular recess through which the press-fit portion 44c enters and exits, as illustrated in FIG. 8. Therefore, without increasing the thickness of the bottom portion 46b of the second movable iron core 46, the cross-sectional area of the magnetic path within the second movable iron core 46 can be secured without thinning the wall thickness from the tubular portion 46a to the bottom portion 46b, and magnetic flux saturation within the second movable iron core 46 can be suppressed. In other words, magnetic flux saturation in the second movable iron core 46 can be suppressed without increasing the axial length of the bottom portion 46b of the second movable iron core 46.

When a structure is adopted in which the second movable iron core 46 is slidably inserted into the first movable iron core 45 in this way, inexpensive press-fit can be adopted to join the filler ring 42 to the second fixed iron core 44 without increasing the axial length of the second movable iron core 46. Even if the axial length of the solenoid 40 is not increased, in the state where the second movable iron core 46 and the first movable iron core 45 are most separated, that is, in the state where the second movable iron core 46 is closest to the second fixed iron core 44 in the axial direction and the first movable iron core 45 abuts on the fitting portion 43b of the first fixed iron core 43, a sufficient length (wrap length) of the portion where the tubular portion 46a of the second movable iron core 46 is in contact with the sliding contact tube 45a of the first movable iron core 45 can be ensured.

That is, even if the total length of the second movable iron core 46 is the same as in the conventional solenoid, since the axial length that is the width of the bottom portion 46b of the second movable iron core 46 does not need to be increased, the length of the tubular portion 46a can also be ensured to be the same as in the conventional solenoid. If the length of the sliding contact tube 45a of the first movable iron core 45 is set to be the same as in the conventional solenoid, the wrap length that is the same as in the conventional solenoid can be secured. Therefore, even if the total length of the solenoid 40 is the same as in the conventional solenoid, the wrap length when the first movable iron core 45 and the second movable iron core 46 are most separated does not decrease, and the attraction exerted by the solenoid 40 on the first movable iron core 45 and the second movable iron core 46 also does not decrease. Therefore, even if an inexpensive structure is adopted for the solenoid 40, the total length of the solenoid 40 does not increase, and the solenoid 40 can generate sufficient driving force.

Furthermore, the solenoid 40 of the present embodiment includes the tubular filler ring 42 disposed in the inner circumference of the coil 41 and interposed between the first fixed iron core 43 and the second fixed iron core 44. The first movable iron core 45 is slidably inserted into the inner circumference of the filler ring 42. The second fixed iron core 44 includes the annular press-fit portion 44c press-fitted in the filler ring 42, and the second movable iron core 46 is slidably inserted into the inner circumference. In the solenoid 40 configured in this way, the filler ring 42 can guide axial movement of the first movable iron core 45 and the second movable iron core 46, and the filler ring 42 and the second fixed iron core 44 can be integrated inexpensively by causing the press-fit portion 44c to be press-fitted in the filler ring 42.

In the solenoid 40 of the present embodiment, the first movable iron core 45 includes the sliding contact tube 45a that is in sliding contact with the outer circumference of the second movable iron core 46, the annular bottom portion 45b protruding from one end of the sliding contact tube 45a toward the inner circumference, and the annular protrusion 45c in which the annular bottom portion 45b protrudes toward the first fixed iron core 43 and leaves and sits on the first fixed iron core 43. In the solenoid 40 configured in this way, when the first movable iron core 45 is attracted to the first fixed iron core 43, only the annular protrusion 45c abuts on the first fixed iron core 43. Therefore, even if a contaminant such as cutting chips enters between the first movable iron core 45 and the first fixed iron core 43, when the annular protrusion 45c approaches and sits on the first fixed iron core 43, the contaminant escapes to the inner circumference or the outer circumference of the annular protrusion 45c, that is between the first movable iron core 45 and the first fixed iron core 43, thereby making it possible to prevent the contaminant from being bitten between the annular protrusion 45c and the first fixed iron core 43. Therefore, even if the contaminant exists between the first movable iron core 45 and the first fixed iron core 43, the annular protrusion 45c of the first movable iron core 45 can be attracted to the first fixed iron core 43 and brought into close contact. If the current amount Ib is always supplied to the coil 41, the first movable iron core 45 can be maintained in a state of being adsorbed to the first fixed iron core 43, and the operation of the solenoid 40 is stabilized.

Note that the axial length of the annular protrusion 45c is set to a length in the range 0.13 mm to 0.15 mm such that when the annular protrusion 45c abuts on the fitting portion 43b of the first fixed iron core 43, the magnetic flux from the first movable iron core 45 to the first fixed iron core 43 can pass through not only the annular protrusion 45c but also the gap created in the inner circumference and the outer circumference of the annular protrusion 45c. With this configuration, besides the annular protrusion 45c, the above-described gap can also form part of the magnetic path P, the adsorption force that causes the first movable iron core 45 to be adsorbed to the first fixed iron core 43 can be increased, and the radial width of the annular protrusion 45c can be made as narrow as possible to effectively reduce the risk of contaminant bite. Note that if the gap created in the inner circumference and the outer circumference of the annular protrusion 45c is not used as the magnetic path P, it is required at least to set the cross-sectional area of the annular protrusion 45c cut in a plane perpendicular to the axial direction such that the attraction force can be ensured.

Since the annular protrusion 45c of the first movable iron core 45 is provided on the outer circumferential side of the annular bottom portion 45b and the outer diameter of the annular protrusion 45c is smaller than the diameter of the annular bottom portion 45b, the annular protrusion 45c sits at a radially separated position from the outer circumferential edge of the fitting portion 43b when abutting on the fitting portion 43b of the first fixed iron core 43. The outer circumference of the fitting portion 43b of the first fixed iron core 43 may not be flat due to machining influence of the first fixed iron core 43 or contact with other parts and may have a partially raised shape. However, if configured as described above, the annular protrusion 45c will avoid the outer circumferential edge of the fitting portion 43b that may not have a flat shape and abut on the fitting portion 43b, enabling the entire annular protrusion 45c to adhere to the fitting portion 43b. The annular protrusion 45c is disposed on the outer circumferential side of the annular bottom portion 45b, and the sealed space created on the outer circumferential side of the annular protrusion 45c decreases when the annular protrusion 45c abuts on the fitting portion 43b of the first fixed iron core 43, facilitating the movement of the first movable iron core 45 to the first fixed iron core 43 side. Note that the space on the inner circumferential side of the annular protrusion 45c when abutting on the fitting portion 43b of the first fixed iron core 43 communicates with the outside of the solenoid 40 via the inside of the spring seat 52 and the communication hole 46c of the second movable iron core 46, thereby not preventing movement of the first movable iron core 45.

Furthermore, in the solenoid 40 of the present embodiment, the filler ring 42 includes the flange 42a that faces the press-fit portion 44c in the axial direction in the inner circumference, and the seal ring 50 is provided that is interposed between the flange 42a and the press-fit portion 44c and seals between the filler ring 42 and the second fixed iron core 44. In the solenoid 40 configured in this way, since the seal ring 50 is interposed between the flange 42a of the filler ring 42 and the press-fit portion 44c of the second fixed iron core 44, the total length of the press-fit portion 44c can be shorter than when a structure is adopted in which an annular groove is provided in the outer circumference of the press-fit portion 44c to which the seal ring is attached. Therefore, the press-fit portion 44c can be shortened, thereby reducing the total length of the solenoid 40 of the present embodiment.

Subsequently, the following describes the operation of the damping valve 1 and the shock absorber 100 including the damping valve 1 according to the present embodiment. When the shock absorber 100 expands and contracts and the hydraulic oil is discharged from the extension side chamber 104 through the damping valve 1 to the reservoir 108, in a case where the damping valve 1 operates normally, the pressure upstream of the passage 10e and the pilot passage 23 increases. When a current is supplied to the solenoid 40 to adjust the valve opening pressure of the solenoid valve 24, the pressure between the orifice 10d in the pilot passage 23 and the solenoid valve 24 is led to the back pressure chamber 5.

The internal pressure of the back pressure chamber 5 is controlled by the valve opening pressure of the solenoid valve 24, the pressure acting on the back of the leaf valve 3 can be adjusted by adjusting the valve opening pressure with the solenoid 40, and furthermore, the valve opening pressure by which the leaf valve 3 opens the passage 10e can be controlled.

Figure 7:
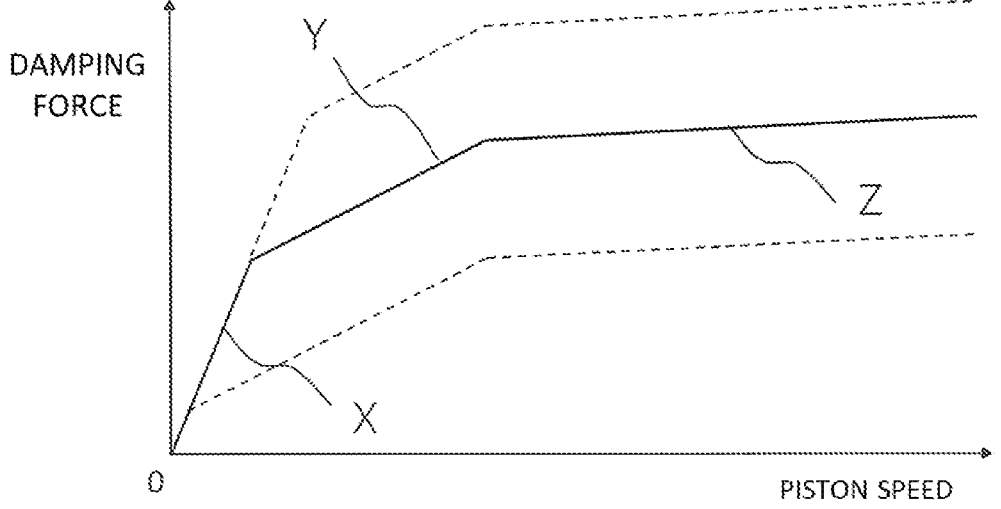
FIG. 7 is a diagram illustrating damping characteristics of the shock absorber to which the damping valve according to one embodiment of the present invention is applied.

In more detail, when the pressure within the intermediate chamber 9 is increased by the pressure within the extension side chamber 104 and the force to deflect the outer circumference of the leaf valve 3 rightward in FIG. 3 overcomes the internal pressure of the back pressure chamber 5 and the pressing force by the leaf spring 7, the leaf valve 3 deflects and leaves the valve seat 2b, forming a gap between the leaf valve 3 and the disk 2, opening the passage 10e. Therefore, adjustment of the pressure in the back pressure chamber 5 in magnitude by the solenoid valve 24 allows the pressure in the intermediate chamber 9 that can cause the leaf valve 3 to leave the valve seat 2b to be adjusted in magnitude. That is, the valve opening pressure of the leaf valve 3 can be controlled by the current amount applied to the solenoid 40. Therefore, as illustrated in FIG. 7, the damping force characteristic of the shock absorber 100 (characteristic of damping force with respect to the piston speed) shows a characteristic with a large damping coefficient (line X in FIG. 7) until the leaf valve 3 is opened because the hydraulic oil passes through the sliding gap of the damping valve 1 and the notch orifice 2d. When the leaf valve 3 leaves the valve seat 2b and opens the passage 10e, the damping force characteristic shows a characteristic of decreasing inclination, that is, decreasing damping coefficient, as indicated by the line Y in FIG. 7.

As described above, since the pressure intensification ratio in the leaf valve 3 is smaller than the pressure intensification ratio in the disk 2 and the valve opening pressure of the leaf valve 3 is smaller than the valve opening pressure of the disk 2, if the differential pressure generated by the port 2a does not reach the valve opening pressure that causes the disk 2 to leave the base portion 10a, the disk 2 will remain seated on the base portion 10a. Meanwhile, if the leaf valve 3 deflects to be in a valve open state, the piston speed of the shock absorber 100 increases, and the differential pressure generated by the port 2a reaches the valve opening pressure that causes the disk 2 to leave the base portion 10a, then the disk 2 will also leave the base portion 10a and open the passage 10e. Then, compared with the case where only the leaf valve 3 is in the valve open state and the passage 10e communicates with the reservoir 108 via the port 2a only, when the disk 2 leaves the base portion 10a, the passage 10e directly communicates with the reservoir 108 without via the port 2a and the channel area increases. Therefore, the damping force characteristic of the shock absorber 100 has a smaller inclination than when only the leaf valve 3 is in the valve open state as indicated by the line Z in FIG. 7, that is, the damping coefficient is even smaller.

Then, when the current amount to the solenoid 40 is adjusted and the valve opening pressure of the solenoid valve 24 is increased or decreased, the damping force characteristic of the shock absorber 100 can be changed so as to move the line Y and the line Z up or down in the range indicated by the dashed lines in FIG. 7.

The pressure intensification ratio in the leaf valve 3 can be smaller than the pressure intensification ratio in the disk 2, whereby the valve opening pressure of the leaf valve 3 is smaller than the valve opening pressure of the disk 2, and the passage 10e is relieved in two stages. Therefore, the damping valve 1 can decrease the damping force at full soft time that minimizes the valve opening pressure of the solenoid valve 24, and can increase the variable range of the damping force.

Therefore, the damping valve 1 of the present embodiment can output soft damping force when the piston speed of the shock absorber 100 is in the low speed range without excessive damping force, and can also increase the upper limit of hard damping force requested when the piston speed is in the high speed range without causing insufficient damping force. Therefore, applying the damping valve 1 to the shock absorber 100 allows the damping force variable range to be increased and ride quality in a vehicle to be improved.

Note that in the present embodiment, the solenoid valve 24 includes: the valve seat member 21 including the tubular small-diameter cylindrical portion 21a including the through-hole 21d that causes the inside and outside to communicate with each other, and the annular valve seat 21f provided at the end of the small-diameter cylindrical portion 21a; and the valve body 22 including the small-diameter portion 22a slidably inserted into the small-diameter cylindrical portion 21a, the large-diameter portion 22b, and the recess 22c provided between the small-diameter portion 22a and the large-diameter portion 22b and facing the through-hole 21d. The end of the large-diameter portion 22b in the valve body 22 leaves and sits on the valve seat 21f. Therefore, the solenoid valve 24 can reduce the pressure receiving area where pressure acts in the direction in which the valve body 22 exits the valve seat member 21, and can increase the channel area when the valve is open while reducing the pressure receiving area. With this configuration, the pressure receiving area of the valve body 22 can be reduced to reduce the driving force that the solenoid 40 should output, and by increasing the channel area when opening the valve, the amount of movement of the valve body 22 can be reduced and overshoot when the solenoid valve 24 opens excessively can be reduced.

At the time of failure, the current supply to the solenoid 40 is cut off, but the solenoid 40 includes the first movable iron core 45 and the second movable iron core 46, and can apply the driving force to the valve body 22 by the spring 47 even when no current passes in the same direction as when a current passes. Therefore, the damping valve 1 of the present embodiment sets the valve opening pressure of the leaf valve 3 to an arbitrarily preset value by causing the solenoid 40 to exert driving force even at the time of failure, and allows the shock absorber 100 to exert sufficient damping force.

Note that with a general pull-type solenoid that cannot apply driving force to the valve body 22 at the time of failure, the pressure in the back pressure chamber 5 is extremely low, the valve opening pressure of the leaf valve 3 is also extremely low, resulting in insufficient damping force of the shock absorber. Therefore, when using such a solenoid, the structure of the damping valve becomes complicated, for example, a separate fail valve is required to increase the pressure in the back pressure chamber 5 at the time of failure. In contrast, the damping valve 1 of the present embodiment can cause the shock absorber 100 to exert preset damping force at the time of failure without requiring installation of a separate fail valve.

With a general push-type solenoid that applies maximum driving force to the valve body 22 at the time of failure, the pressure in the back pressure chamber 5 is maximum, the valve opening pressure of the leaf valve 3 is also maximum, resulting in excessive damping force of the shock absorber. Therefore, when using such a solenoid, the structure of the damping valve is complicated, for example, a separate fail valve is required to make the pressure in the back pressure chamber 5 appropriate at the time of failure. In contrast, the damping valve 1 of the present embodiment can cause the shock absorber 100 to exert preset damping force at the time of failure without requiring installation of a separate fail valve.

The damping valve 1 and the shock absorber 100 operate as described above. The solenoid valve 24 of the present embodiment includes the valve body 22 that opens and closes the pilot passage (passage) 23. The solenoid 40 gives, to the valve body 22, force that attracts the second movable iron core 46 to the second fixed iron core 44 side, the force being generated when a current passes through the coil 41 in the direction of closing the pilot passage (passage) 23. Therefore, it is possible to adjust the valve opening pressure of the valve body 22 in normal times and set the valve opening pressure of the valve body 22 at the time of failure with the pressing force of the spring 47. The solenoid valve configured in this way can use a low-cost, small solenoid to adjust the valve opening pressure of the valve body, and can set the valve opening pressure of the valve body at the time of failure with the pressing force of the spring. Furthermore, as described above, the solenoid 40 of the present embodiment can increase the driving force to be given to the object as the current amount supplied increases. Therefore, with the solenoid valve 24, as the current amount to supply to the solenoid 40 increases, the driving force the solenoid 40 gives to the valve body 22 in the closing direction increases, and the valve opening pressure of the solenoid valve 24 can be increased.

The damping valve 1 of the present embodiment includes the disk 2 with the port 2a and the valve seat 2b surrounding the port 2a, the leaf valve 3 that opens and closes the port 2a by causing the front side to sit on and leave the valve seat 2b, the tubular housing 4 provided on the back side of the leaf valve 3, the annular spool 6 that abuts on the back of the leaf valve 3 and is slidably inserted into the inner circumference of the housing 4 to form the back pressure chamber 5 that causes the back pressure to act on the leaf valve 3 inwardly together with the housing 4, the annular spring support portion 4g that is located on the back side of the leaf valve 3, faces the inside of the back pressure chamber 5, and has a smaller outer diameter than the inner diameter of the spool 6, and the annular leaf spring 7 that is interposed between one end of the spool 6 that is the opposite end of the leaf valve and the spring support portion 4g and presses the spool 6 in a direction of abutting on the leaf valve 3.

In the damping valve 1 configured in this way, the spool 6 is disposed in the inner circumference of the housing 4 to allow the spool 6 to have a smaller inner and outer diameter, and the leaf spring 7 pressing the spool 6 is supported by the opposite end of the leaf valve of the spool 6, eliminating the need to provide the spring seat that supports the leaf spring 7 in the inner circumference of the spool 6. Therefore, since the damping valve 1 of the present embodiment can reduce the inertial mass of the spool 6 by reducing the volume of the spool 6, the influence of the inertia of the spool 6 when opening and closing the leaf valve 3 is reduced, and the responsiveness can be improved for the opening and closing operation of the leaf valve 3.

In the damping valve 1 of the present embodiment, the spring support portion 4g faces the back of the leaf valve 3 and abuts only on the opposite side of the leaf valve of the inner circumferential end of the leaf spring 7. In the damping valve 1 configured in this way, since only the inner circumference of the leaf spring 7 on the opposite side of the leaf valve abuts on the spring support portion 4g facing the back of the leaf valve 3 and the inner circumference of the leaf spring 7 is not fixedly supported by the housing 4, the total deflection amount of the leaf spring 7 with respect to the amount of movement of the spool 6 can be reduced, and the apparent spring constant of the leaf spring 7 can be made low. Here, when trying to further reduce the inertial mass of the spool 6, the inner and outer diameters of the spool 6 will be reduced, but as a result, the difference between the inner and outer diameters of the leaf spring 7 decreases, the spring constant increases, and the valve opening pressure of the leaf valve 3 varies from product to product, leading to an antinomy. However, since the damping valve 1 of the present embodiment can reduce the apparent spring constant of the leaf spring 7 and reduce the influence of the leaf spring 7 on the opening pressure of the leaf valve 3, even if the inner and outer diameters of the spool 6 are reduced and the inertial mass is reduced accordingly, it is possible to prevent variations in the damping force. That is, the damping valve 1 configured in this way can further reduce the inertial mass of the spool 6 and further improve the responsiveness in the opening and closing operation of the leaf valve 3.

Furthermore, the damping valve 1 of the present embodiment is configured such that the spool 6 includes the tapered portion 6b inside the first-end outer circumferential portion 6a that is outer circumference of one end, and that the leaf spring 7 abuts on the spool 6 only at the first-end outer circumferential portion 6a.

The damping valve 1 configured in this way can increase the supporting diameter of the leaf spring 7 on the outer circumferential side, and can reduce the deflection amount of the leaf spring 7. Therefore, by providing the tapered portion 6b inside the first-end outer circumferential portion 6a of the spool 6 in this way, the apparent spring constant of the leaf spring 7 can be reduced. Therefore, the damping valve 1 configured in this way can further reduce the inertial mass of the spool 6 and further improve the responsiveness in the opening and closing operation of the leaf valve 3, as in the case where the inner circumference of the leaf spring 7 is not fixedly supported as described above.

In addition, the damping valve 1 of the present embodiment is configured such that the spool 6 includes the tapered portion 6d inside the second-end outer circumferential portion 6c, which is the outer circumferential portion at the second end that is the leaf valve side end, and that the leaf valve 3 abuts only on the second-end outer circumferential portion 6c of the spool 6. The damping valve 1 configured in this way allows higher degree of flexibility in the selection of the number of annular plates and the outer diameter of the leaf valve 3 because the tapered portion 6d of the spool 6 forms a space to avoid the leaf valve 3 and the spool 6 does not interfere with the leaf valve 3.

The damping valve 1 of the present embodiment includes the pilot passage 23 that causes the inside of the back pressure chamber 5 to communicate with the upstream side of the port 2a, and the solenoid valve 24 that controls the pressure in the back pressure chamber 5. The damping valve 1 configured in this way can adjust the damping force of the shock absorber 100 by adjusting the pressure in the back pressure chamber 5 with the solenoid valve 24 and changing the valve opening pressure of the leaf valve 3. In this embodiment, the orifice 10d is provided in the pilot passage 23 to reduce the pressure in the passage 10e and introduce the pressure into the back pressure chamber 5, but in addition to the orifice, other valves such as a choke may be used to reduce the pressure.

Note that the damping valve 1 of the present embodiment controls the pressure in the back pressure chamber 5 with the solenoid 40 to control the valve opening pressure of the disk 2 and the leaf valve 3. However, even if the solenoid 40 does not control the valve opening pressure of the solenoid valve 24 and the solenoid valve 24 does not control the pressure of the back pressure chamber 5 as a passive pressure control valve, the pressure intensification ratio in the leaf valve 3 can be made smaller than the pressure intensification ratio in the disk 2. Therefore, the damping characteristic can be changed in two stages, small damping force can be output without excessive damping force when the piston speed is in a low speed range, large damping force can be output when the piston speed reaches a high speed range, and insufficient damping force can be solved.

Furthermore, since the disk 2 is stacked in a floating state with respect to the valve holding member 10, the passage 10e can be greatly opened, and the damping coefficient when the valve of the disk 2 is open can be reduced, greatly facilitating the damping force control by the solenoid 40. Since the leaf valve 3 is an annular leaf valve with the inner circumference fixed to the valve holding member 10 and the outer circumference leaving and sitting on the valve seat 2b, even if the disk 2 is provided and the damping force is changed in two stages, after the leaf valve 3 presses the disk 2 and the disk 2 releases the passage 10e, returning to a position to sit on the base portion 10a is helped. Therefore, there is no delay in closing the passage 10e when the expansion and contraction direction of the shock absorber 100 is switched, and the responsiveness of damping force generation is not impaired.

The shock absorber 100 of the present embodiment includes the cylinder 101, the rod 103 movably inserted into the cylinder 101 in the axial direction, the disk 2 including the port 2a through which liquid flows when the cylinder 101 and the rod 103 move relatively in the axial direction and the valve seat 2b surrounding the port 2a, the leaf valve 3 that opens and closes the port 2a by leaving and sitting on the valve seat 2b, the pilot passage 23 that is provided with the orifice (orifice) 10d partway and reduces the pressure on the upstream side of the port 2a and guides the pressure to the back of the leaf valve 3, the solenoid valve 24 that controls the pressure on the back of the leaf valve 3, and the solenoid 40 that gives, to the solenoid valve 24, the driving force that is created when a current passes through the coil
41 to attract the second movable iron core 46 to the second
fixed iron core 44 side.

With such a configuration, when resistance is given by the
leaf valve 3 to the flow of liquid passing through the port 2a
when the cylinder 101 and the rod 103 move relatively in the
axial direction, the shock absorber 100 can generate the
damping force caused by the resistance. Since the back
pressure of the leaf valve 3 can be adjusted by the solenoid
valve 24, the damping force generated by a change in the
current amount supplied to the solenoid 40 can be adjusted
in magnitude, and the back pressure of the leaf valve 3 can
be set by setting the pressing force of the spring 47 of the
solenoid 40 at the time of failure, enabling optimization of
the damping force generated by the shock absorber 100 at
the time of failure. Therefore, the shock absorber 100
configured in this way, which can adjust the back pressure
of the leaf valve 3 by using the solenoid valve 24 that uses
the low-cost, small solenoid, can adjust the damping force in
magnitude at a low cost and without leading to larger size.

Furthermore, as described above, in the solenoid valve 24,
since the valve opening pressure of the solenoid valve 24 can
be increased as the current amount supplied to the solenoid
40 increases, in the shock absorber 100, the back pressure of
the leaf valve 3 can be increased and the generated damping
force can be increased as the current amount supplied to the
solenoid 40 is increased. That is, in the shock absorber 100
configured in this way, since the damping force generated
when the current amount supplied to the solenoid 40 is small
can be reduced, when the shock absorber 100 is used for
vehicle suspension, the power consumption during normal
traveling can be reduced. Since this allows heat generation
of the solenoid 40 to be inhibited and a change in the
temperature of the shock absorber to be reduced, the change
in damping force characteristics caused by the liquid tem-
perature change (characteristics of damping force with
respect to piston speed) can be reduced.

The shock absorber 100 of the present embodiment
includes the cylinder 101, the piston 102 that is movably
inserted into the cylinder 101 and divides the cylinder 101
into the extension side chamber 104 and the compression
side chamber 105 that are filled with liquid, the rod 103
connected to the piston 102, the reservoir 108 storing the
liquid, the suction passage 110 that only allows the flow of
hydraulic oil from the reservoir 108 to the compression side
chamber 105, the rectifying passage 111 that allows only the
flow of hydraulic oil from the compression side chamber
105 to the extension side chamber 104, the discharge pas-
sage 106 that causes the extension side chamber 104 to
communicate with the reservoir 108, and the damping valve
1 provided in the discharge passage 106 with the extension
side chamber 104 as upstream of the port 2a and the
reservoir 108 as downstream of the port 2a.

The shock absorber 100 configured in this way is config-
ured as a uniflow shock absorber in which liquid is always
discharged from within the cylinder 101 through the dis-
charge passage 106 to the reservoir 108 when expanding or
contracting, and one responsive damping valve 1 gives
resistance to the liquid flow, improving the responsiveness
of damping force generation.

Note that when applied to the uniflow shock absorber 100
in this way, the damping valve 1 including the solenoid 40
can improve the responsiveness of damping force generation
regardless of the direction of expansion or contraction of the
shock absorber 100, but may be applied to a bi-flow shock
absorber. The bi-flow shock absorber includes a single-tube
shock absorber with an air chamber inside the cylinder and a twin-tube shock absorber with a reservoir outside the
cylinder. In the single-tube shock absorber, the piston
includes an extension side passage that allows the liquid
flow from an extension side chamber to a compression side
chamber, and a compression side passage that allows the
liquid flow from the compression side chamber to the
extension side chamber. In the twin-tube shock absorber, in
addition to these extension side passage and the compression
side passage, the piston includes a suction passage allows
the liquid flow from a reservoir disposed outside the cylinder
to the compression side chamber, and a discharge passage
that allows the liquid flow from the compression side
chamber to the reservoir. The solenoid valve 24 including
the solenoid 40 and the damping valve 1 can be installed in
any of the extension side passage, the compression side
passage, and the discharge passage. The shock absorber
including the solenoid valve 24 or the damping valve 1 in
this way can adjust the damping force generated by chang-
ing the current amount supplied to the solenoid 40 in
magnitude, can set the back pressure of the leaf valve 3 by
setting the pressing force of the spring 47 of the solenoid 40
at the time of failure, and can optimize the damping force
generated by the shock absorber 100 at the time of failure.

The damping valve 1 of the present embodiment changes
the damping force in two steps by the leaf valve 3 opening
and closing the port 2a of the disk 2 that opens and closes
the passage 10e provided in the base portion 10a of the valve
holding member 10. However, if there is no need to change
the damping force in two steps, the following structure may
be adopted in which the disk 2 is abolished and the base
portion 10a of the valve holding member 10 is used as the
disk, the passage 10e of the base portion 10a is used as the
port, the base portion 10a is provided with a valve seat
surrounding the passage 10e, and the passage 10e is opened
and closed by the leaf valve 3.

Although the preferred embodiment of the present inven-
tion has been described above in detail, modifications,
variations, and changes are still possible without departing
from the scope of the claims.

The invention claimed is:

1. A solenoid comprising:
   a coil;
   a first fixed iron core disposed on an axial first-end side of
      the coil;
   a second fixed iron core disposed on an axial second-end
      side of the coil with a gap from the first fixed iron core;
   a tubular first movable iron core disposed between the
      first fixed iron core and the second fixed iron core, and
      attracted to the first fixed iron core by passing a current
      through the coil;
   a second movable iron core having a tubular shape with
      a bottom and slidably inserted into the first movable
      iron core, the second movable iron core being disposed
      between the first fixed iron core and the second fixed
      iron core with the bottom facing the second fixed iron
      core, and attracted to the second fixed iron core by
      passing the current through the coil; and
   a spring interposed between the first movable iron core
      and the first fixed iron core, and pressing the first
      movable iron core to the second fixed iron core side,
   wherein the second fixed iron core has a tubular portion
      into which the bottom of the second movable iron core
      is slidably inserted and that faces an axial end of the
      first movable iron core,
   the first movable iron core includes a sliding contact tube
      that is in sliding contact with an outer circumference of
      the second movable iron core and an annular bottom portion protruding from one end of the sliding contact
tube toward an inner circumference, and the annular bottom portion includes an annular protrusion
that protrudes toward the first fixed iron core and leaves
and sits on the first fixed iron core.

2. A solenoid valve comprising:

a valve body that opens and closes a passage; and the solenoid according to claim 1, wherein the solenoid applies force that is generated when
passing the current through the coil and attracts the
second movable iron core to the second fixed iron core
side to the valve body in a direction to close the
passage.

3. A shock absorber comprising:

a cylinder;

a rod movably inserted into the cylinder in an axial
direction;

a disk including a port through which liquid flows when
the cylinder and the rod move relatively in the axial
direction and a valve seat surrounding the port;

a leaf valve that opens and closes the port by leaving and
sitting on the valve seat;

a pilot passage that is provided with an orifice partway
and reduces pressure on an upstream side of the port
and guides the pressure to back of the leaf valve;

a solenoid valve that controls pressure on the back of the
leaf valve; and the solenoid according to claim 1 that gives, to the
solenoid valve, driving force that is generated when
passing the current through the coil to attract the second
movable iron core to the second fixed iron core side.

4. A shock absorber comprising:

a cylinder;

a rod movably inserted into the cylinder in an axial
direction;

a disk including a port through which liquid flows when
the cylinder and the rod move relatively in the axial
direction and a valve seat surrounding the port;

a leaf valve that opens and closes the port by leaving and
sitting on the valve seat;

a pilot passage that is provided with an orifice partway
and reduces pressure on an upstream side of the port
and guides the pressure to back of the leaf valve;

a solenoid valve that controls pressure on the back of the
leaf valve; and the solenoid according to claim 1 that gives, to the
solenoid valve, driving force that is generated when
passing the current through the coil to attract the second
movable iron core to the second fixed iron core side.

5. A solenoid comprising:

a coil;

a first fixed iron core disposed on an axial first-end side of
the coil;

a second fixed iron core disposed on an axial second-end
side of the coil with a gap from the first fixed iron core;

a tubular first movable iron core disposed between the
first fixed iron core and the second fixed iron core, and
attracted to the first fixed iron core by passing a current
through the coil;

a second movable iron core having a tubular shape with
a bottom and slidably inserted into the first movable
iron core, the second movable iron core being disposed
between the first fixed iron core and the second fixed
iron core with the bottom facing the second fixed iron
core, and attracted to the second fixed iron core by
passing the current through the coil;

a spring interposed between the first movable iron core
and the first fixed iron core, and pressing the first
movable iron core to the second fixed iron core side;
and a tubular filler ring disposed on an inner circumference of
the coil and interposed between the first fixed iron core
and the second fixed iron core, wherein the second fixed iron core has a tubular portion
into which the bottom of the second movable iron core
is slidably inserted and that faces an axial end of the
first movable iron core, the first movable iron core is slidably inserted into an
inner circumference of the filler ring, the second fixed iron core includes an annular press-fit
portion that is press-fitted in the filler ring and the
second movable iron core is slidably inserted into an
inner circumference, the filler ring includes a flange axially facing the press-fit
portion on an inner circumference, and the solenoid includes a seal ring interposed between the
flange and the press-fit portion to seal between the filler
ring and the second fixed iron core.

6. A shock absorber comprising:

a cylinder;

a rod movably inserted into the cylinder in an axial
direction;

a disk including a port through which liquid flows when
the cylinder and the rod move relatively in the axial
direction and a valve seat surrounding the port;

a leaf valve that opens and closes the port by leaving and
sitting on the valve seat;

a pilot passage that is provided with an orifice partway
and reduces pressure on an upstream side of the port
and guides the pressure to back of the leaf valve;

a solenoid valve that controls pressure on the back of the
leaf valve; and the solenoid according to claim 5 that gives, to the
solenoid valve, driving force that is generated when
passing the current through the coil to attract the second
movable iron core to the second fixed iron core side.

7. A solenoid comprising:

a coil;

a first fixed iron core disposed on an axial first-end side of
the coil;

a second fixed iron core disposed on an axial second-end
side of the coil with a gap from the first fixed iron core;

a tubular first movable iron core disposed between the
first fixed iron core and the second fixed iron core, and
attracted to the first fixed iron core by passing a current
through the coil;

a second movable iron core having a tubular shape with
a bottom and slidably inserted into the first movable
iron core, the second movable iron core being disposed
between the first fixed iron core and the second fixed
iron core with the bottom facing the second fixed iron
core, and attracted to the second fixed iron core by
passing the current through the coil; and a spring interposed between the first movable iron core
and the first fixed iron core, and pressing the first
movable iron core to the second fixed iron core side, wherein the second fixed iron core has a tubular portion
into which the bottom of the second movable iron core
is slidably inserted and that faces an axial end of the
first movable iron core, the first movable iron core includes a sliding contact tube
that is in sliding contact with an outer circumference of
the second movable iron core and an annular bottom portion protruding from one end of the sliding contact tube toward an inner circumference, the annular bottom portion includes an annular protrusion that protrudes toward the first fixed iron core and leaves and sits on the first fixed iron core, the annular protrusion is provided on an outer circumferential side of the annular bottom portion, and an outer diameter of the annular protrusion is smaller than a diameter of the annular bottom portion.

8. A shock absorber comprising:

a cylinder;

a rod movably inserted into the cylinder in an axial direction;

a disk including a port through which liquid flows when the cylinder and the rod move relatively in the axial direction and a valve seat surrounding the port;

a leaf valve that opens and closes the port by leaving and sitting on the valve seat;

a pilot passage that is provided with an orifice partway and reduces pressure on an upstream side of the port and guides the pressure to back of the leaf valve;

a solenoid valve that controls pressure on the back of the leaf valve; and the solenoid according to claim 7 that gives, to the solenoid valve, driving force that is generated when passing the current through the coil to attract the second movable iron core to the second fixed iron core side.

9. A solenoid comprising:

a coil;

a first fixed iron core disposed on an axial first-end side of the coil;

a second fixed iron core disposed on an axial second-end side of the coil with a gap from the first fixed iron core;

a tubular first movable iron core disposed between the first fixed iron core and the second fixed iron core, and attracted to the first fixed iron core by passing a current through the coil;

a second movable iron core having a tubular shape with a bottom and slidably inserted into the first movable iron core, the second movable iron core being disposed between the first fixed iron core and the second fixed iron core with the bottom facing the second fixed iron core, and attracted to the second fixed iron core by passing the current through the coil;

a tubular spring seat attached to the first movable iron core; and a spring interposed between the first movable iron core and the first fixed iron core, and pressing the first movable iron core to the second fixed iron core side, wherein the first movable iron core includes: a sliding contact tube that slides and contacts an outer circumference of the second movable iron core; and an annular bottom portion protruding from one end of the sliding contact tube toward an inner circumference, wherein the tubular spring seat includes an annular spring support portion attached to the inner circumference of the annular bottom portion at one end of an outer circumference and protruding inward from one end of an inner circumference, wherein a first-end side of the spring abuts against the first fixed iron core, and wherein a second-end side of the spring is inserted into the spring seat and abuts against the annular spring support portion.

10. A solenoid comprising:

a coil;

a first fixed iron core disposed on an axial first-end side of the coil;

a second fixed iron core disposed on an axial second-end side of the coil with a gap from the first fixed iron core;

a tubular first movable iron core disposed between the first fixed iron core and the second fixed iron core, and attracted to the first fixed iron core by passing a current through the coil;

a second movable iron core having a tubular shape with a bottom and slidably inserted into the first movable iron core, the second movable iron core being disposed between the first fixed iron core and the second fixed iron core with the bottom facing the second fixed iron core, and attracted to the second fixed iron core by passing the current through the coil; and a spring interposed between the first movable iron core and the first fixed iron core, and pressing the first movable iron core to the second fixed iron core side, wherein the second fixed iron core includes a part having an annular shape, and the second movable iron core is slidably inserted into an inner circumference of the part, and wherein an axial movement of the second movable iron core is guided only in such a manner that the second movable iron core slides and contacts the first movable iron core and the part of the second fixed iron core.

* * * * *